US010140660B2

(12) United States Patent
Crocker et al.

(10) Patent No.: US 10,140,660 B2
(45) Date of Patent: Nov. 27, 2018

(54) SYSTEMS AND METHODS FOR ENFORCING FIDUCIARY COMPLIANCE

(75) Inventors: Larry E. Crocker, Lascassas, TN (US); William Sean Harrison, Smyrna, TN (US)

(73) Assignee: Fiduciary Compliance Corp., Murfreesboro, TN (US)

( * ) Notice: Subject to any disclaimer, the term of this patent is extended or adjusted under 35 U.S.C. 154(b) by 1610 days.

(21) Appl. No.: 12/410,363

(22) Filed: Mar. 24, 2009

(65) Prior Publication Data

US 2010/0250313 A1    Sep. 30, 2010

(51) Int. Cl.
*G06Q 40/06* (2012.01)
*G06Q 10/06* (2012.01)
*G06Q 30/00* (2012.01)

(52) U.S. Cl.
CPC ....... *G06Q 40/06* (2013.01); *G06Q 10/06395* (2013.01); *G06Q 30/018* (2013.01)

(58) Field of Classification Search
CPC ......... G06Q 10/0639; G06Q 10/06393; G06Q 10/06398
See application file for complete search history.

(56) References Cited

U.S. PATENT DOCUMENTS

2001/0051906 A1* 12/2001 Esposito ......................... 705/35
2003/0217036 A1* 11/2003 Haunschild et al. ............. 707/1
2005/0010509 A1* 1/2005 Straub ............................ 705/35
2007/0226721 A1* 9/2007 Laight et al. .................. 717/154
2009/0012834 A1* 1/2009 Fahey .............................. 705/9

OTHER PUBLICATIONS

"Executive Summary—FRA's Master Diagnostic System", *The FRA Master Diagnostic Suite of Fiduciary Tools. Fiduciary Risk Assessment*, http://www.fiduciary-risk.com/products.php?item=45, 2 pgs.
"*Fiduciary Risk Assessment* Services", Fiduciary Risk Assessment, http://www.fiduciary-risk.com/services.php, 1 pg.
(Continued)

*Primary Examiner* — Julie M Shanker
(74) *Attorney, Agent, or Firm* — Schwegman Lundberg & Woessner, P.A.

(57) ABSTRACT

Systems and methods for enforcing compliance with fiduciary responsibilities related to the administration of a retirement plan are disclosed. The systems and methods include accessing compliance requirements corresponding to the fiduciary responsibilities related to administration of the retirement plan by a fiduciary. Upon accessing the requirements, compliance tasks are extracted in an example implementation. Once compliance tasks are extracted from the requirements, due dates for the compliance tasks are determined based on dates associated with the compliance requirements, or in some examples based on date chosen by a fiduciary. The compliance tasks are then stored in a database, in an example. The systems and methods then monitor the one or more compliance tasks and send alerts based on monitored activities. Finally, in an example implementation, responses to the alerts are tracked to determine whether any follow up action needs to be triggered.

19 Claims, 14 Drawing Sheets

(56) References Cited

OTHER PUBLICATIONS

"Phase 1: 404c Master Diagnostic, Investment Profile and Marketing Modules", *The FRA Master Diagnostic Suite of Fiduciary Tools. Fiduciary Risk Assessment*, http://www.fiduciary-risk.com/products.php?item=13 [Last accessed Jul. 24, 2009], 2 pgs.
"Phase 2: Expense Analysis, GAP Analysis, Plan Benchmarking and Plan Design Analysis", *The FRA Master Diagnostic Suite of Fiduciary Tools. Fiduciary Risk Assessment*, http://www.fiduciary-risk.com/products.php?item=14 [Last accessed Jul. 24, 2009], 2 pgs.
"Phase 3: 404a Diagnostic, Committee Education and Investment Policy Statement", *The FRA Master Diagnostic Suite of Fiduciary Tools. Fiduciary Risk Assessment*, http://www.fiduciary-risk.com/products.php?item=15 [Last accessed Jul. 24, 2009], 2 pgs.
"Phase 4: Insurance, Service Provider and Advisor Analysis", *The FRA Master Diagnostic Suite of Fiduciary Tools. Fiduciary Risk Assessment*, http://www.fiduciary-risk.com/products.php?item=16 [Last accessed Jul. 24, 2009], 1 pg.
"Phase 5: Administrative Analysis and Nonqualified Deferred Compensation Analysis", *The FRA Master Diagnostic Suite of Fiduciary Tools. Fiduciary Risk Assessment*, http://www.fiduciary-risk.com/products.php?item=17 [Last accessed Jul. 24, 2009], 1 pg.
"The FRA Master Diagnostic Suite of Fiduciary Tools", *Fiduciary Risk Assessment*, http://www.fiduciary-risk.com/products.php, 1 pg.

\* cited by examiner

SYSTEMS AND METHODS FOR ENFORCING FIDUCIARY COMPLIANCE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, Fiduciary Compliance Corp. All Rights Reserved.

TECHNICAL FIELD

This document pertains generally to monitoring fiduciary compliance, and more particularly, but not by way of limitation, to systems and methods for tracking and enforcing fiduciary compliance in the administration of retirement plans.

BACKGROUND

Administration of retirement plans places the plan sponsor, the plan administrator and the plan fiduciaries (e.g., advisors, trustees, etc. . . . ) in a fiduciary relationship with the plan's participants and their beneficiaries. This particular fiduciary relationship is highly regulated by multiple government entities, such as the IRS or Department of Labor. These regulatory entities create thousands of pages of regulations related to the management of plans. To make matters even more complicated there are many different types of retirement plans. Traditionally, companies commonly offered defined benefit plans, also referred to as pension plans. More recently, companies have been turning towards defined contribution plans, such as 401a, 401K, 403b and 457 plans.

Some of the government regulations may apply to all retirement plans, but most deal with only a specific portion of the available retirement plan types. This mass of intertwined regulations makes the management of a retirement plan a daunting task for even the most seasoned professional. To make the situation even more complicated the recent financial crisis is likely to further increase the volume and frequency of changes to the governing regulations.

One example of government regulation is the Employee Retirement Income Security Act of 1974 (ERISA). (Pub.L. 93-406, 88 Stat. 829, enacted Sep. 2, 1974.) ERISA is a federal statute that establishes minimum standards for pension plans in private industry and provides for extensive rules on the federal income tax effects of transactions associated with employee benefit plans. ERISA was enacted to protect the interests of employee benefit plan participants and their beneficiaries. ERISA requires the disclosure of financial and other information concerning the plan, by a fiduciary responsible for administration of the plan. ERISA provides protection by establishing standards of conduct for plan fiduciaries and by providing for appropriate remedies and access to the federal courts.

ERISA is sometimes used to refer to the full body of laws regulating employee benefit plans, which are found in the United States Code (mainly in the section on Internal Revenue Service) and ERISA itself. Responsibility for the interpretation and enforcement of ERISA is divided among the Department of Labor, the Department of the Treasury (particularly the Internal Revenue Service), and the Pension Benefit Guaranty Corporation.

While ERISA encompasses a wide range of regulations and requirements relating to the administration of a retirement plan, other regulations from the IRS for example can impose additional requirements. This complicated structure of government regulation, court rulings interpreting the regulations, and other influences create a mine field for retirement plan administrators and fiduciaries attempting to comply with her fiduciary responsibilities.

Overview

The transition from defined benefit plans to defined contribution plans has shifted the burden of saving from the employer to the employee. However, this shift of financial responsibility has not relieved the employer of its fiduciary responsibilities regarding retirement plans. In truth, shifting the responsibility has only increased an employer's fiduciary responsibilities. The company is now essentially responsible for wisely managing money that is more directly attributed to the employee. Unfortunately, most companies incorrectly believed that shifting the financial burden also shifted the related fiduciary responsibilities. Assisting companies in managing these ever increasing fiduciary responsibilities is described herein.

This overview is intended to provide a summary of subject matter of the present patent application. It is not intended to provide an exclusive or exhaustive explanation of the invention. The detailed description is included to provide further information about the present patent application.

The systems and methods described can provide a mechanism for defining, measuring, and enforcing a program of compliance related to the administration of a retirement plan. As will be described in detail below, the systems and methods are tied to compliance tasks, but also include a knowledge base of information about fiduciary compliance and retirement plan administration. In certain examples, when a course of fiduciary compliance is created, various compliance tasks associated with document filings, reports, meetings, and other actions are created. Compliance tasks are created as part of the content associated with a compliance plan definition. For example, a compliance plan definition can be associated with a corresponding 401k program. In this example, the Department of Labor provides regulations that dictate most of the steps required to run a compliant plan. In some examples, the system iterates through the action items associated with a plan of compliance, taking into account one or more factors such as due dates, past and future, items that a client has marked inapplicable, and items that have been deferred, to name just a few. The system determines how compliant the client has been according to the selected plan of compliance.

In some examples, a method of measuring compliance involves scoring. A score associated with each compliance task can be used to calculate an overall compliance score. The overall compliance score can be based on the total number of points applicable at the time of assessment (scoring) and the total number of point associated with each compliance task. The score is an indicator of overall compliance.

In certain examples, the system further encourages compliance by reaching out to the client, such as via emails or other electronic communication methods, at various intervals before or after a due date associated with a compliance task. The frequency and start time of communications (also referred to as alerts) is variable, such as by category or individual compliance task. In some examples, the alerts can continue at periodic or other intervals until someone associated with administration of the plan, with access to the system, takes some action associated with the overdue task.

In an example method for enforcing compliance with a fiduciary responsibility related to administration of a retirement plan, one or more compliance requirements are accessed from one or more sources, such as government regulations. In this example, the compliance requirements are used to extract one or more compliance tasks. Once the compliance requirements are extracted, one or more due dates based on dates associated with the respective requirements are defined. In this example, the compliance tasks are stored in a database to enable monitoring of one or more activities associated with the compliance tasks. An alert can be sent, such as based on monitoring that a compliance task meets a specified alerting condition. Once an alert has been sent, the alert can be tracked such as to determine whether any additional follow up action needs to be taken.

In some examples, determining a compliance task's due date includes identifying a static date defined by the compliance requirement. In this example, a static date is a specific date provided by the requirement, such as a tax return must be filed on or before April 15$^{th}$ of each year. In certain examples, the static date is the date on which the task is created. In another example, determining a compliance task's due date includes identifying a dynamic date associated with the compliance requirement. A dynamic date is a date that is described by a compliance requirement but does not include a specific date. For example, a compliance requirement can require that a retirement plan have a quarterly meeting, but the compliance requirement will not define specific dates for the meetings. In this example, identifying the dynamic date can include receiving input regarding each particular individual retirement plan's schedule associated with the dynamic date.

In certain examples, extracting a compliance task includes creating a compliance task title, a compliance task summary, and a compliance task status. In some examples, the compliance task status is initially set to pending. In an example, creating a compliance task summary includes creation of three different levels of verbosity, such as ranging from a short, e.g., couple of sentences, summary to linking to the contents of the entire regulation that generated the compliance task. In some examples, extracting a compliance task can also include linking a sample document, a template or a check list to the compliance task. A sample document can include a completed example document, such as from a fictitious similar retirement plan. A template can include a fill-in the blank type document, such as complying with the requirements of the compliance task. A check list can include a list of individual steps that need to be taken, which are associated with the compliance task.

In some examples, monitoring compliance tasks includes reviewing the compliance task status. In an example, the compliance task status can be completed, deferred, inapplicable, or pending. In an example, monitoring compliance tasks includes scanning the compliance task data for compliance tasks with due dates within a task alert window. The task alert window can be a lead time for generating alerts based on the compliance task due dates. For example, the task alert window can be set to one week before a due date. In this example, alerts will start to be sent one week before any compliance task due date. In certain examples, the task alert window is configured when the compliance task is defined, such as while determining the due date. In an example, compliance tasks are organized into categories and task alert windows are configured by category.

In certain examples, alerts are sent when a specified alerting condition is detected. In these examples, the specified alerting condition can include the compliance task status switching from a status of pending to a status of completed. In other examples, the specified alerting condition can include the compliance task status switching between any of the other possible status conditions.

In an example, alerts sent out regarding compliance tasks can be communicated through some form of electronic message. In certain examples, the electronic message can include an e-mail message. In another example, the electronic message can include an instant message or text message to a communications or computing device. In yet another example, the electronic message could be sent through a system such as Twitter (http://twitter.com), or another social networking platform. In some examples, the alerts can be sent over multiple electronic messaging systems, such as via e-mail and instant messaging. Additionally, electronic alert messages can be configured to include a hyperlink directly into the compliance enforcement system, providing quick access to the compliance task requiring attention. In certain examples, alerts can also be sent via facsimile (FAX). As the discussed options demonstrate, the alerting system can be configurable to provide messages over the medium favored by each individual user.

In some examples, the compliance enforcement methods and systems include the ability to score the current level of compliance with a compliance plan. In certain examples, the compliance score provides an indication of the level of activity associated with the retirement plan. In an example, updating the compliance score includes calculating a cumulative compliance task score, calculating a client efficiency score, and determining the compliance score using the cumulative task score and the client efficiency score. In this example, the client efficiency score can include a measure of how timely a client's responses are to various compliance tasks associated with a retirement plan.

In certain examples of implementations, the compliance accountability system includes a server that has a processor, memory and a communications interface. The compliance accountability system can also include a compliance task database connected to the server through the communications interface. The compliance accountability system's processor can execute instructions stored on a computer-readable medium to perform at least some of the operations and methods described herein.

In an example of a system for tracking compliance with fiduciary responsibilities related to administration of a retirement plan, the system includes a server, a compliance task database, a monitoring module, an alerting engine, and a scoring module. The server can include a processor, memory and a communications interface. The compliance task database can be used to store one or more compliance tasks and can be connected to the server through the communications interface. The stored compliance tasks can include at least a description, a due date and a status flag. The monitoring module can be configured to monitor compliance task activities and can operate on the server. An example of a compliance task activity includes a change in the status flag. The alerting engine can be configured to receive notifications from the monitoring module and send out alert messages regarding the monitored compliance tasks. The scoring module can be configured to evaluate the overall progress in completing compliance tasks and determine a compliance score for the retirement plan.

An example compliance accountability system includes a server, a compliance task database, a calendar management module, a monitoring module, and an alerting engine. The server can include a processor, memory, and a communications interface. The compliance task database can be configured to store compliance tasks and connects to the server through the communications interface. The calendar management module can be configured to maintain a compliance task associated with a fiduciary responsibility related to the administration of a retirement plan. The calendar management module can maintain the compliance tasks within the compliance task database. The monitoring module can be configured to monitor activity related to the compliance task maintained by the calendar management module. The alerting engine can be configured to send an alert message based on a trigger from the monitoring module. In an example, triggers are generated based on a condition associated with the compliance task maintained by the calendar management module.

In certain examples, the compliance accountability system includes a document vault. The document vault can be configured to manage a document associated with the compliance task maintained by the calendar management module. In an example, the monitoring module can be configured to monitor activity within the document vault. The alerting engine can also be configured to send out alerts based on monitored activity within the document vault, or in some cases the lack of activity in the document vault. In certain examples, the alerting engine is configured to send out alerts based on detection of a missing document, within the document vault, by the monitoring module.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
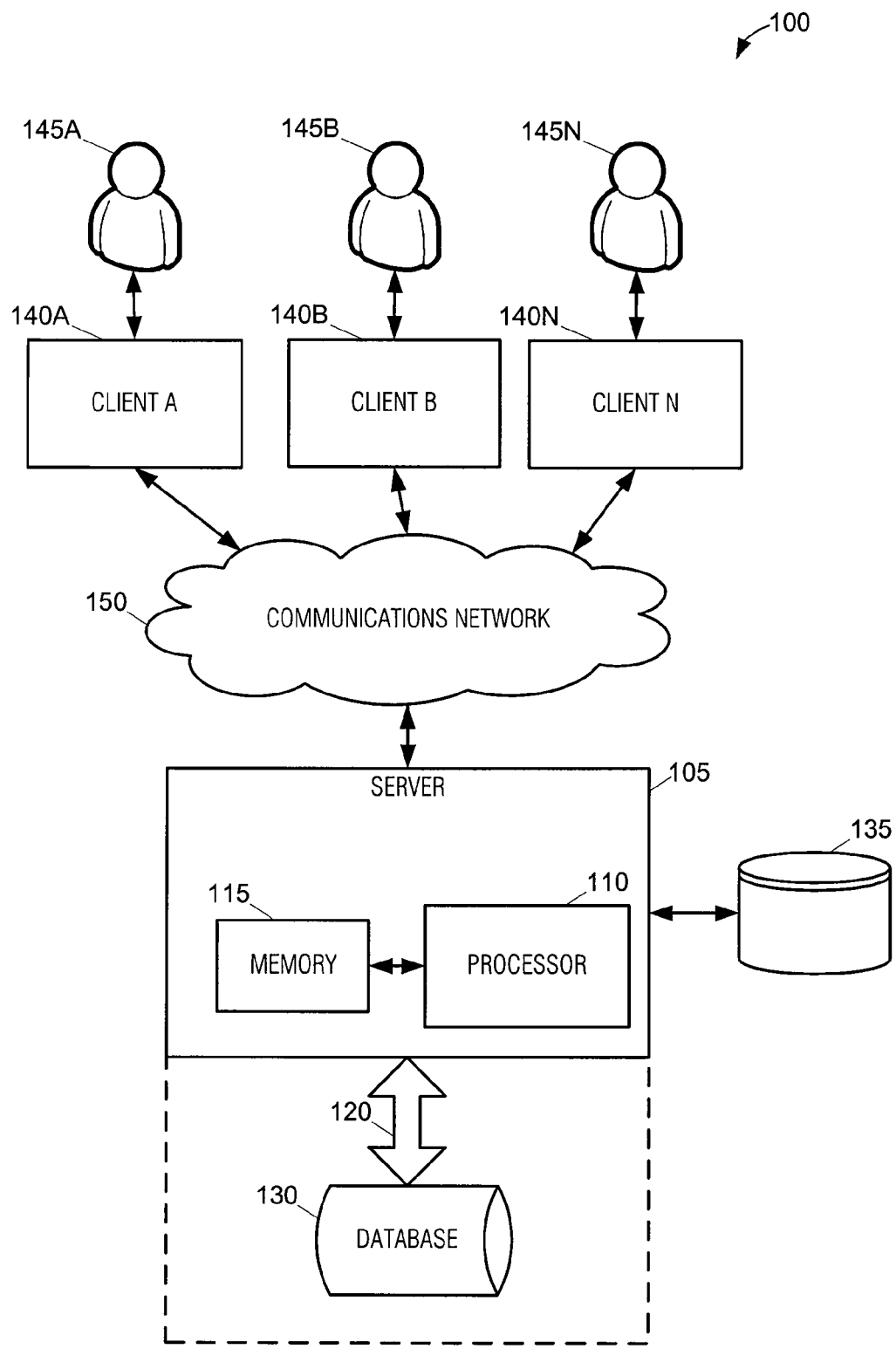
FIG. 1 illustrates an example of high level system components used for enforcing fiduciary compliance in the administration of a retirement plan.

FIG. 1 illustrates an example of high level system components used for enforcing fiduciary compliance in the administration of a retirement plan. In this example, a system 100 includes a server 105, a database 130, a communications network 150, and one or more clients 140A, 140B, . . . , 140N (collectively hereinafter referred to as 140). The server 105 can include a processor 110 and a memory 115. The server 105 can also access a computer-readable medium 135 that can contain instructions that when executed on or interpreted by the processor 110 cause the system 100 to provide a compliance enforcement system. Specific examples of methods and operations of a compliance enforcement system are detailed below in reference to FIGS. 5-13.

In certain examples, the server 105 includes a database 130 connected over a communication bus 120. In an example, the server 105 connects over a communication bus 120 to an external database 130. In either configuration the database 130 can be used to store compliance tasks and associated information necessary to enforce compliance in the administration of a retirement plan. The database 130 can include table structures and programming necessary to deliver the operations described below in reference to FIGS. 5-13. In some examples, the database 130 can also include the table structures and programming detailed below in reference to FIG. 5, which describes an example security system. In other examples, the database table structures and programming necessary to deliver an example security system can be maintained in a separate security database.

In certain examples, the server 105 is connected to a client 140 over a communications network 150. In some examples, the communications network 150 includes a wide-area network (WAN), such as the internet. In another example, the communications network 150 can be a local-area network (LAN), such as an internal corporate network. In an example, the server 105 can be located on a local-area network with a client 140 accessing the server 105 over the internal network while another client 140 accesses the system over an external WAN, such as the internet. In an example, one or more users 145A, 145B, . . . , 145N (collectively hereinafter referred to as 145) use the one or more clients 140 to access the system 100.

The users 145 depicted using clients 140 to connect to the server 105 over the communication network 150 can include a wide variety of people or entities involved in the administration of a typical retirement plan. Retirement plans often have a retirement plan sponsor; this sponsor can be the ERISA 3(16) administrator or can be another individual designated by a sponsoring organization. Other potential users 145 include a plan trustee, plan advisers, plan CPA, administrative staff and an ERISA advisor. Plan advisers can include investment brokers, investment advisors, licensed insurance agents, or bank trust personnel. Plan sponsor administrative staff can include human resources and accounting. The various users 145 can each have different levels of security access into the system 100. As will be described below in reference to FIG. 5, different levels of security can translate into different levels of capability to view, add, edit, or remove data within the system 100.

Figure 2:
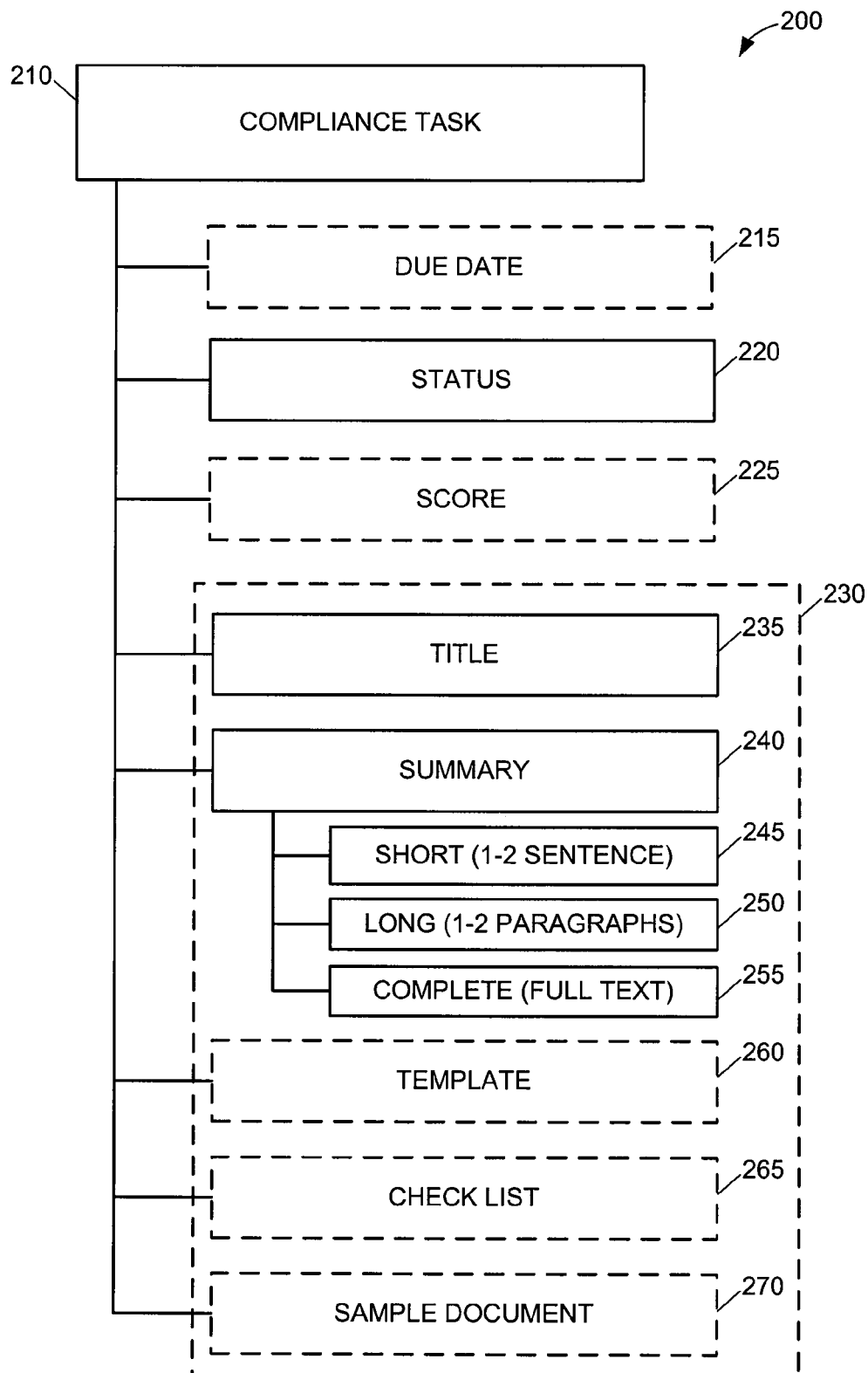
FIG. 2 illustrates a block diagram of an example of a compliance task.

FIG. 2 illustrates a block diagram of an example of a compliance task. In this example, the diagram 200 includes a compliance task 210 that can include an optional due date 215, a status 220, an optional compliance score 225 and associated content 230. The compliance task's content 230 can include a title 235, a summary 240, an optional template 260, an optional check list 265, and an optional sample document 270. In certain examples, the summary 240 can include a short summary 245, a long summary 250, and a complete recitation 255 of the regulations associated with the compliance task 210. In some examples, the complete recitation 255 can link to one or more applicable regulations such as via one or more hyperlinks or similar technology. In other examples, the complete recitation 255 is stored in the compliance database 130. An example of the compliance task 210 will be described in further detail below in reference to FIG. 6. In some examples, the optional compliance score 225 can be represented by a percentage or a point total. While not depicted as a component of a compliance task 210 in FIG. 2, a compliance task 210 can have additional meta-data associated with it by the compliance database 130. Associated meta-data can include user 145 comments on a particular task, such as in the case of deferring completion of a task.

Figure 3:
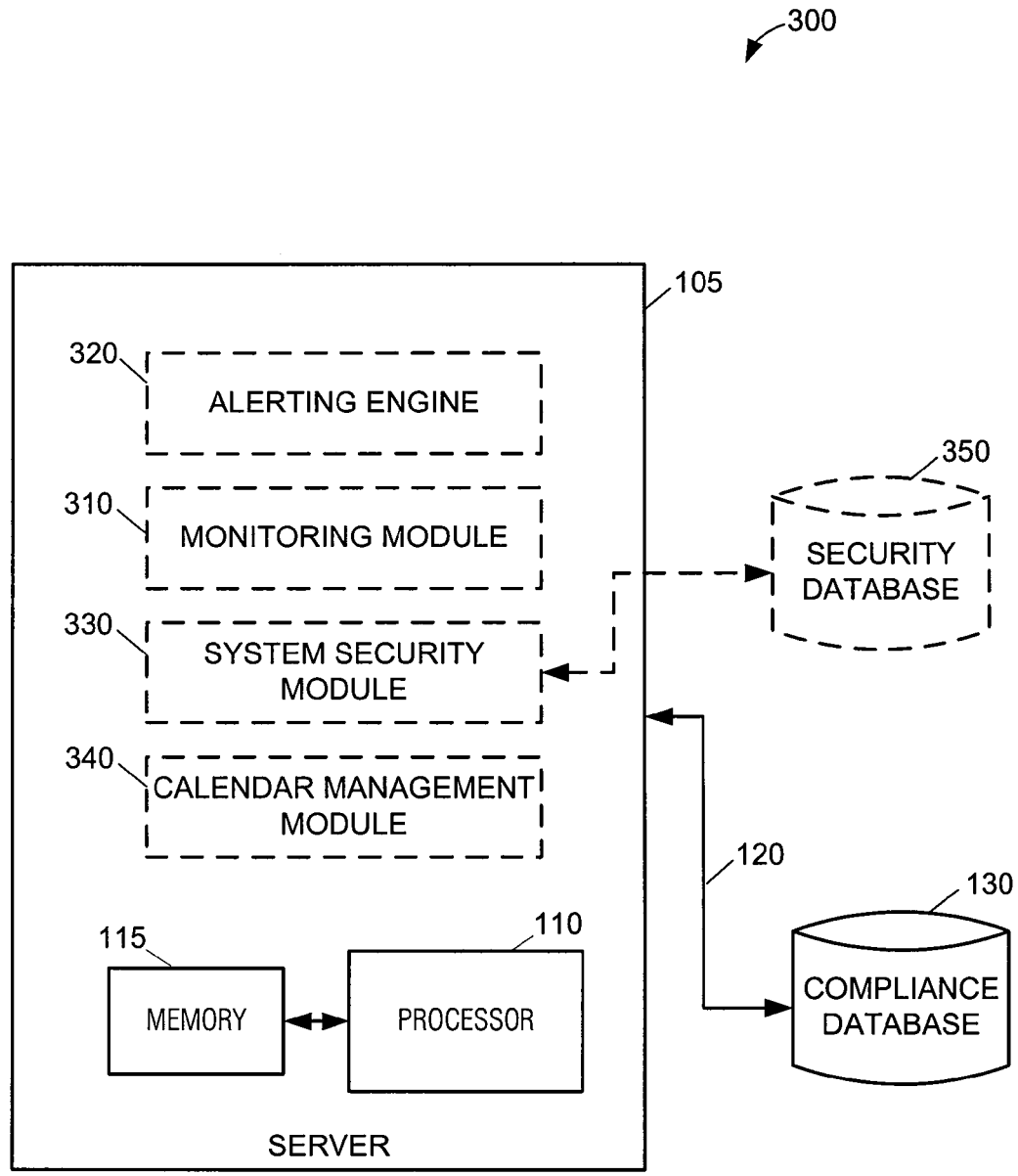
FIG. 3 illustrates an example of a system for enforcing fiduciary compliance in the administration of a retirement plan.

FIG. 3 illustrates an example of a system for enforcing fiduciary compliance in the administration of a retirement plan. In this example, the system 300 includes a number of additional components that can be configured to operate within the server 105. In system 300, the server 105 can include an alerting engine 320, a monitoring module 310, a system security module 330, and a calendar management module 340. Some examples of configurations can include a reduced combination of the components shown as part of system 300. For example, in certain examples, an external security module can be substituted for the system security module 330. In this example, user authentication and other security related services can be provided such as by an external lightweight directory access protocol (LDAP) server or Microsoft's Active Directory™ server. These external services can be connected to server 105 such as over the communication bus 120 or the communication network 150 depicted in FIG. 1.

The calendar management module 340 can be configured to manage compliance tasks 210 in accordance with scheduled due dates 215. Generally, compliance tasks 210 created as part of a compliance plan will have due dates 215 associated with the task. In an example, a compliance plan includes a collection of compliance tasks. However, in certain examples, a compliance task 210 will not include an actual due date 215. In an example of this scenario, the calendar management module 340 can manage the task 210 as if it is currently due to be completed. In additional examples, compliance tasks 210 can be created without a specific due date 215, but with what can be referred to as a dynamic date. For example, a dynamic date can represent a quarterly meeting; quarterly meetings need to occur every 3 months. However, quarterly meetings do not, at least initially, have to have a specific date and time associated with them. The calendar management module 340 can handle dynamic dates, such as by requesting a user to enter a specific date at some point in time after the task is created. The calendar management module 340 can track the quarterly dynamic date and require that a specific date be entered within, for example, one month of the end of the current quarter. The timing of such a request to a user can be configured for individual tasks, groups of tasks or globally within the system 300.

In some examples, the monitoring module 310 works in coordination with the calendar management module 340 and the alerting engine 320 such as to identify conditions that require attention and alert the applicable user 145. In those configurations, the monitoring module 310 can be configured to check the status 220 of the various compliance tasks 210 in relationship to each task's due date 215. Additionally, the monitoring module 310 can be configured to monitor items associated with a compliance task 210, such as a check list 265, a document, or an event. Generally, the monitoring module 310 functions to recurrently or periodically scan the compliance database 130 for compliance task status 220 changes, upcoming due dates 215, or other miscellaneous conditions that might require attention by a user 145 or a fiduciary advisor. In certain examples, fiduciary advisors are individuals in charge of monitoring the operation of the system 300. The monitoring module 310, through the alerting engine 320, can notify either a user 145 or a fiduciary advisor of the condition of compliance tasks 210 managed by the calendar management module 340.

In certain examples of configurations, the alerting engine 320 functions as the system's 300 mechanism to communicate with external entities regarding the status of compliance tasks 210 maintained by the server 105 in the compliance database 130. The alerting engine 320 can be capable of sending communications via multiple channels, such as e-mail or FAX. In certain examples, the alerting engine 320 can include one or more software modules each configured to communicate over a specific channel of communication. One example is an e-mail server capable of transmitting messages via simple mail transport protocol (SMTP). Another example includes a FAX server capable of transmitting facsimile data over a plain-old telephone (POTS) line or via an internet protocol (IP) connection using voice-over IP (VOIP) technologies. In another example, the alerting engine 320 can be configured to send pre-recorded or generated voice messages over POTS or VOIP. Regardless of the message type or medium of transmission, the alerting engine 320 is responsible for sending out communications based on information gathered by the monitoring module 310, the calendar management module 340, or the security module 330.

Figure 4:
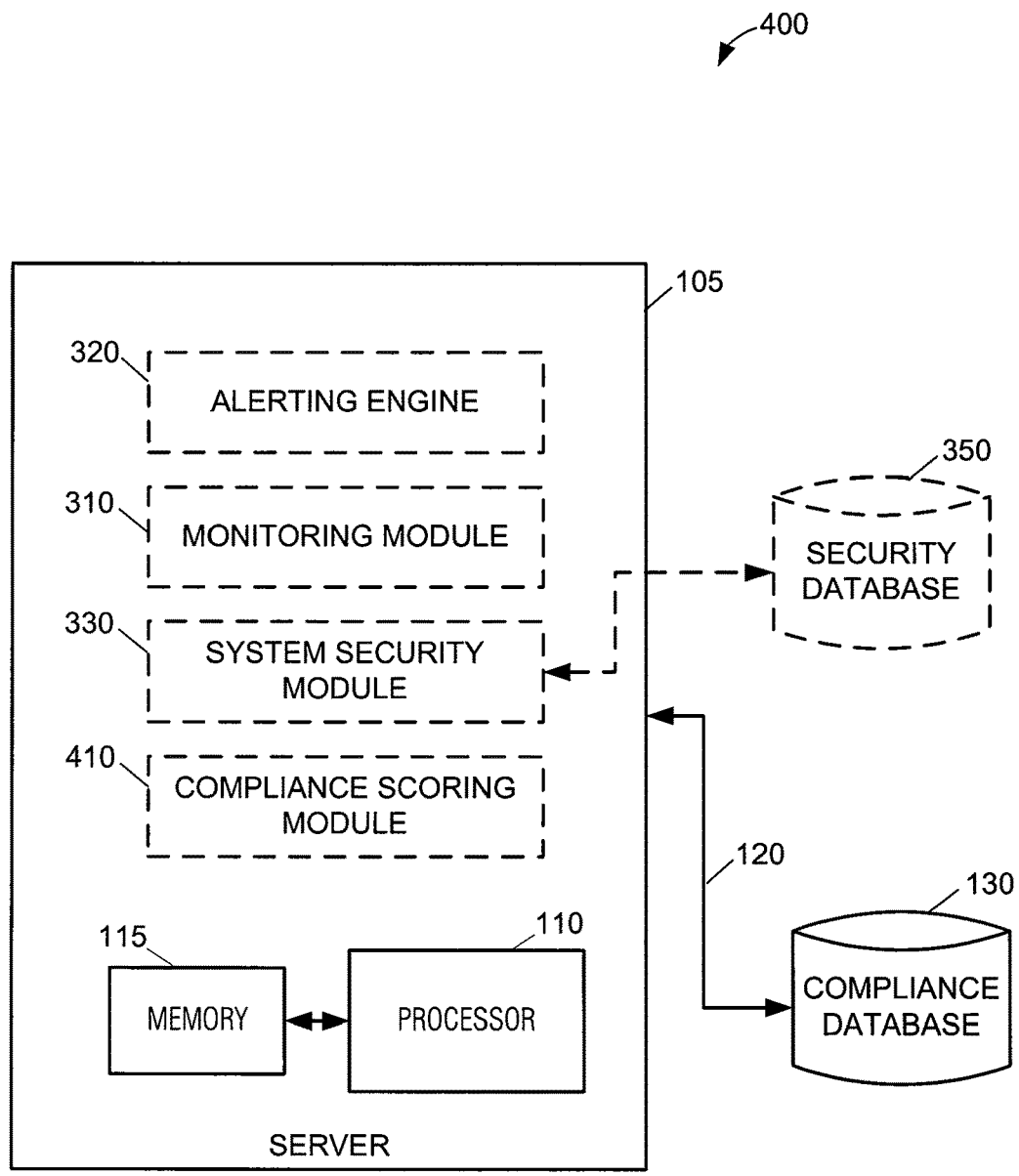
FIG. 4 illustrates an example of a system for enforcing fiduciary compliance in the administration of a retirement plan that includes a scoring capability.

FIG. 4 illustrates an example of a system for enforcing fiduciary compliance in the administration of a retirement plan that includes a scoring capability. In this example, the system 400 includes additional components that can be configured to operate within the server 105. In system 400, the server 105 includes an alerting engine 320, a monitoring module 310, a system security module 330, and a compliance scoring module 410. Example configurations can include a reduced combination of the components shown in as part of system 400 or additional components depicted in system 300. For example, in certain arrangements, the calendar management module 340 depicted in FIG. 3 could also be configured to operate on server 105 within system 400.

In an example of a configuration, the server 105 includes a compliance scoring module 410. In this configuration, the compliance scoring module 410 in coordination with the monitoring module 310 assesses the current status of compliance tasks 210 stored within the compliance task 210 database 130 to produce a compliance score. The compliance score provides an objective numerical feedback mechanism to quickly assess the status of compliance to the fiduciary requirements of a particular retirement plan. In certain examples, the scoring module 410 can use the alerting engine 320 to communicate scores to a user 145. In an example of a scenario, the scoring module 410 could be configured to send an alert, through the alerting engine 320, if the current compliance score falls below a predefined threshold. In this scenario, the alert could be sent to the plan sponsor, a fiduciary advisor or any designated individual (any user 145 with appropriate access to the particular plan). The person or entity receiving the alert is then able to follow up to ensure that pending compliance tasks 210 are addressed in order to raise the compliance score above the alert threshold. Examples of additional compliance scoring details are discussed below in reference to FIGS. 6 and 9.

Figure 5:
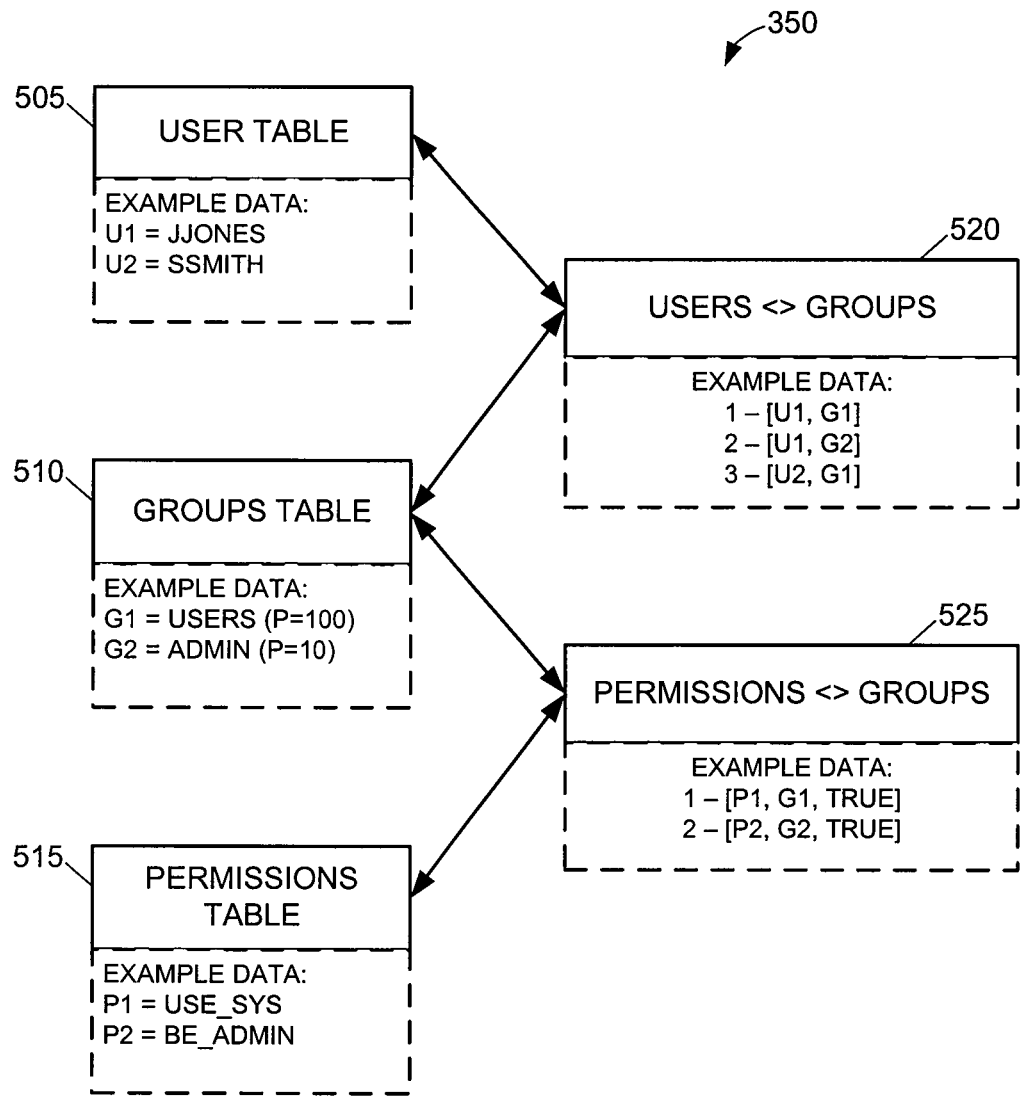
FIG. 5 illustrates an example of a security model used with a system for enforcing fiduciary compliance in the administration of a retirement plan.

FIG. 5 illustrates an example of a security model used with a system for enforcing fiduciary compliance in the administration of a retirement plan. In this example, the security model depicted can be implemented in the security database 350 illustrated in FIGS. 3 and 4. The security database 350 can include a user table 505, a groups table 510, a permissions table 515, a users to groups table 520, and a permissions to groups table 525. The users table 505 can include entries for every person or entity that is authorized to access the system 300 (the system 300 is used as a representative system for enforcing compliance with fiduciary responsibilities associated with a retirement plan). The groups table 510 can include entries for each group of people or entities with similar access (permission) level requirements. The group table 510 illustrates two example groups, USERS and ADMIN. Additional examples can include an essentially unlimited number of groups (limited only by the constraints of the implementation database). The permissions table 515 can include entries for each permission the system 300 is capable of providing. Two example permissions include using the system (USE_SYS) and being an administrator of the system (BE_ADMIN). Additional permissions can include, for example, read-only access, read/write access, compliance task 210 creation, and compliance task status 220 editing access.

The users to groups table 520 and the permission to groups table 525 provide a flexible mechanism for linking users to permissions. The permissions to groups table 525 includes entries that associate particular permissions from the permissions table 515 to particular groups from the groups table 510. This configuration allows for a fine level of granularity in assigning permissions to groups. Similarly, the users to groups table 520 associates users in the user table 505 to particular groups in the groups table 510. Thus, in this example of a security model, users can obtain permissions through association with a group that includes the particular permission.

Entries within the user table 505 can include user names, passwords, title, organization, and role within the administration of the retirement plan. The minimum set of information needed within a user entry includes a user name and password. In certain examples, group table entries include a property that can be referred to as precedence. In this example, precedence is used to resolve potentially conflicting permissions due to a user's assignment to multiple groups.

An example use scenario for the security database model 350 can include the following operations:

1. Upon connection to the system 300, a user 145 is assigned a username of anonymous until valid credentials are presented. In this example, the user 145 has not logged into the system 300 through a client 140, but the user 145 is given a unique session identifier.
2. The system 300 loads all of the permissions records from the permissions table 515 and associates them with the user 145 by placing them into a persistent data structure and attaching that structure to the unique session identifier. The values of the permission items (records) are all set to the default values (typically false).
3. Upon the presentation of valid credentials (user 145 executes a successful login), the system 300 will iterate through the groups memberships the user belongs to (as stored in the users to groups table 520), loading new values for each indicated permission value in the client's 140 permissions structure, based on the value stored in the permissions to groups table 525. Permissions values in the user structure can be overwritten multiple times in the process, with the last permission associated processed being the one retained by the user 145.
4. The security model uses precedence, stored in the groups table 510, as the mechanism for handling user memberships in multiple groups with contradictory permission assignments. Precedence is a numeric value assigned to each group upon creation and denotes the loading order of each group upon user login. In this example security model paradigm, groups can be loaded in descending order based on precedence, with each subsequent group potentially overwriting permissions values denoted by the previous group. In this manner, a user may belong to any number of groups and each group of permissions will be processed in order of precedence. In this example, precedence equates to importance, thus leaving the user with the permissions associated with the most important groups.

In an example of an implementation, the permission structure can be read once upon login and attached to the user session, caching the user permissions. In an example, the permission structure can be regenerated with each subsequent user action in real-time. Since the values needed to build the permission structure in an example implementation are all numeric, even the real-time implementation can be responsive and relatively in expensive in terms of processor 110 or memory 115 resources.

A functional example of this security model is also depicted in FIG. 5. In this example, JJones is a member of groups one and two and SSmith is a member of only group one (see example data associated with the user table 505 and the users to groups table 520). When SSmith logs into the system 300, default permissions are loaded (all permissions set to false, at least in this example). Then the system 300 loads the permissions items associated with the Users group (see example data associated with the groups table 510). The permissions to groups table 525 makes the association between the groups table 510 and the permissions table 515. In this example, the USE_SYS permission is associated with the Users group with permissions set to true. At this point in the functional example, SSmith has permission to access the system 300 as a user.

Continuing the functional example, JJones logs into the system 300 and once again the system 300 loads default permissions. Next the system 300 loads the permission items associated with the Users group, as according to the example data JJones is a member of the Users group. Next the system 300 also loads the permission items associated with the Admin group as JJones is also a member of this group. The Admin group is loaded last in this example because the Admin group has a lower precedence value, P=10, than the Users group, where P=100. Thus, the Admin group permission can overwrite the permission associated with the Users group.

The security model depicted in FIG. 5 enables an additional user access control capability called multilevel sandboxing. Multilevel sandboxing allows individual users the ability to create new sub-users and control a subset of permissions inherited by the sub-users. Access control for the sub-users is controlled primarily by the process described above, with additional restrictions as specified and controlled by the sandbox owner (also referred to as a sandbox administrator). In certain examples, users created in a sandbox inherit the permissions structure of their creator. In another example, users created in a sandbox inherit a permissions structure based upon a subset of the groups that the creator belongs to. For example, a sandbox owner may not ever be allowed to give sub-users the ability to create additional sandboxes. Sandbox administrators may create new groups or pools of permission items to be applied to created sub-users. The new groups or pools may be created in conjunction with a specific process or project that has a limited time frame.

Figure 6:
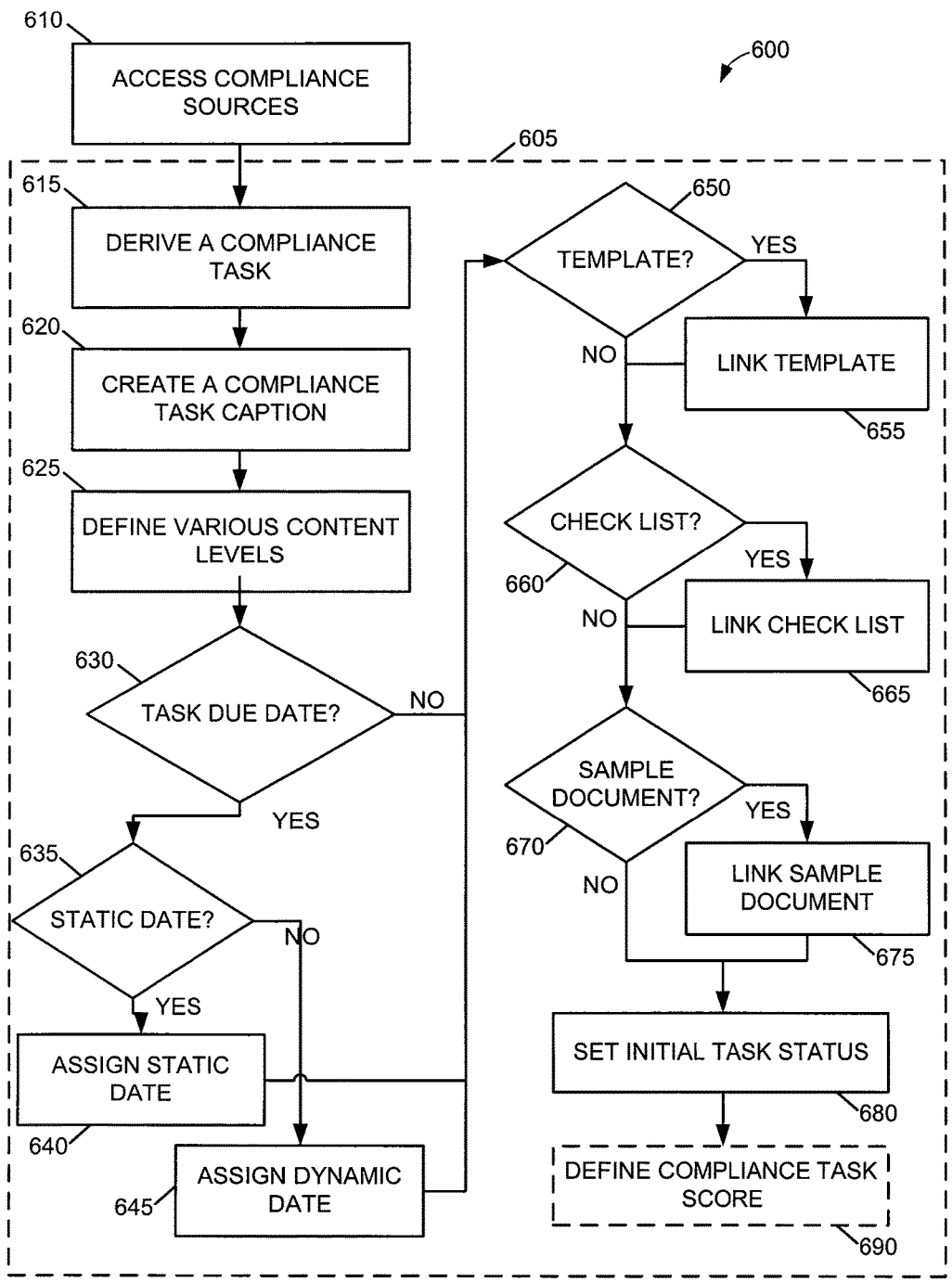
FIG. 6 illustrates an example of a method of creating fiduciary compliance tasks related to the administration of a retirement plan.

FIG. 6 illustrates an example of a method of creating fiduciary compliance tasks 210 related to the administration of a retirement plan. In this example, a method 600 details an example for creating compliance tasks 210 that are stored in the compliance database 130 and enforced by the system 300. The description of the method 600 includes references back to system components discussed in relation to FIGS. 1 and 3-5, these references are by way of example not limitation. In certain examples, the method 600 starts by the system 300 accessing compliance source data at 610. In another example, a user accesses the compliance source data at 610 and inputs the relevant regulations and documentation into the system 300. The compliance sources accessed at 610 can include government regulations from the IRS or the Department of Labor, such as ERISA or Code of Federal Regulations (CFR). The compliance source can also include court rulings interpreting government regulations or state laws, the professional judgment and experience of fiduciary advisors, or other legal references, such as the $3^{rd}$ Restatement of Trusts.

In an example, method 600 continues at 605 by creating a compliance task 210. In certain examples, creating a compliance task at 605 contains numerous additional operations, as depicted in FIG. 6. In these examples, the method 600 continues with compliance task 210 creation at 615 by deriving a compliance task 210 from the compliance sources accessed at 610. In one example, deriving a compliance task 210 involves simply parsing the associated regulation to determine the required action to be compliant with the regulation. In another example, deriving a compliance task 210 can involve correlating multiple regulations and court rulings interpreting the regulations to develop one or more actions that must be taken to maintain compliance. For example, a retirement plan needs to have an investment policy statement. However, ERISA does not include a regulation that requires having a written investment policy, nor does the IRS; the IRS only cares about timely filing of correct forms related to the retirement plan. On the other hand, the Department of Labor requires that a retirement plan have policies and procedures in place for making investment decisions. While the regulation may not "require" these policies and procedures to be in writing, the Department of Labor is not likely to accept a verbal recitation of polices and procedures as acceptable compliance.

Once a task is derived or identified from the compliance sources at 615, the method 600 continues by creating a caption (or title) 235 for the task at 620. The caption 235 is a short descriptive sentence that identifies the task. Captions do not need to be unique as the system 300 will maintain the compliance tasks 210 within a compliance task 210 database 130 that includes unique identifiers for each compliance task 210. Compliance task 210 creation continues at 625 by defining various levels of content for multiple task summaries 240. The system 300 is able to store multiple summaries 240 for each compliance task 210 that will typically range from a short couple sentence summary 245 to a complete recitation 255 of the regulations associated with the task. This multi-level content summary allows selection of a desired verbosity level when reviewing compliance tasks 210 within the system 300. In an example, the system 300 defaults to displaying the first level of verbosity with other levels available via user selection. In another example, the system 300 provides only two verbosity levels, defaulting to a short summary. In an example, the system 300 links the text of the associated regulations or court rulings providing a user easy access to the full detail behind the compliance task 210 if needed. In the two level example, level one includes a short summary, generally at least a couple sentences up to a couple paragraphs. Level two includes the entire text of the regulations that generated the compliance task. In certain examples, the method 600 will create three levels of content at 625. Level one can include a sentence or two detailing the information associated with the compliance task 210. Level two can include a paragraph or two detailing the information contained in the associated compliance sources. Level three can contain every word of the compliance sources associated with the compliance task 210. In this example, level three can replicate the compliance sources word for word. In another example, level three can merely link to the compliance source information associated with the compliance task 210, not requiring the system 300 to store the compliance source data in the compliance database 130.

The method 600 continues at decision 630, determining whether the compliance task 210 includes a due date 215. If the compliance task 210 does not include a due date 215, the method 600 continues at decision 650. At 630, if the compliance task 210 does include a due date 215, then, at 635, the type of date is determined. In an example, the compliance system 300 supports two different date types static and dynamic. Static dates are dates that are defined within the associated compliance sources. For example, the retirement plan must file a tax return on April $15^{th}$ of each year (this is merely an example, retirement plans may or may not be required to file tax returns on a specific date). On the other hand, a dynamic date is a date that is described by a compliance source (or requirement) but does not include a specific date. For example, a retirement plan may be required to hold quarterly investment review meetings; the only requirement is that these meetings occur once every three months the exact date is flexible or dynamic. In certain examples, the system 300 can require that all dynamic dates be determined by a user 145 once the possible date is within a certain predetermined window of time. In another example, the system 300 can request that dynamic dates be determined as soon as the user 145 first logs into the system 300. In yet another example, the system 300 can request dynamic dates immediately and only require them as deadlines for compliance gets within a predetermined window of time. For example, if a user 145 starts maintaining compliance through the system 300 on February 1$^{st}$, the system 300 will immediately request a date for the next quarterly investment review. If the user 145 neglects to enter a date for the next two months, assuming the predetermined window is one month, the system 300 will send out alerts starting on April 1$^{st}$ regarding the unscheduled investment meeting. The system 300 can continue to send alerts until the quarterly meeting, which must occur by the end of April, is scheduled, deferred with an appropriate explanation, or missed. In certain examples, the system 300 can continue to send alerts until the user 145 takes some action to address the compliance task. In some examples, missing a compliance task 210 will impact a client's 140 compliance score and can also result in alerts being generated to additional clients 140 related to the retirement plan administration. In one example, the system 300 can alert a fiduciary advisor who can take additional steps to ensure compliance with the task is maintained. Additional details and examples of scenarios are discussed in relation to FIGS. 7-11 and 13.

Once due dates 215 have been determined or skipped, the method 600 continues at decision 650, determining whether this particular compliance task 210 is going to include a series of optional components (260, 265, 270). The first optional component is a template 260, if the method 600 determines at 650 that there is a template 260 associated with this task, the template 260 will be linked to the task at 655. In certain examples, a template 260 can be a document shell that merely requires the user 145 to fill in the blanks in order to have a compliant document to submit to the appropriate agency. In another example, a template 260 can include an outline suggesting the elements that should be addressed to create a compliant document.

The next optional component is a check list 265; the decision 660 determines whether this compliance task 210 includes a check list 265. If the task includes a check list 265 it is linked to the compliance task 210 at 665. In an example, a check list 265 consists of a series of action items that should be addressed to conform to the compliance task 210. Check lists 265 can be completed and stored back in a document vault 1210 (detailed in reference to FIG. 12 below) to assist in documenting a client's 140 compliance with retirement plan administration requirements. A completed document template 260 can also be stored back into the document vault 1210, which will maintain the document's association with the completed compliance task 210.

The final optional component in this example is a sample document 270. The method 600 includes a decision 670 determining whether the compliance task 210 has an associated sample document 270. If a sample document 270 exists, then the method 600 links the document to the compliance task 210 at 675. In certain examples, a sample document 270 is a completed regulatory submission for a fictitious retirement plan. In these examples, a sample document 270 is included to provide the user 145 with an example of a completed document of the type that needs to be completed to fulfill the associated compliance task 210. In some examples, the sample document 270 can be an actual submission from another retirement plan; this example assumes that the submitted document was publicly available.

The method 600 continues at 680 by setting an initial status 220 for the compliance task 210. In certain examples, the initial status 220 can be pending. In another example, the initial compliance task status 220 can be suggested. In an example, compliance task status 220 can include pending, completed, deferred, inapplicable, or incomplete. In this example, a pending task is a task that has not been completed whose due date 215 is still in the future. In another example, pending can apply to any task that is not completed. In certain examples, a task can be deferred, but an explanation must be entered into the system 300. Similarly, a task can be designated as inapplicable, but an explanation must be entered into the system 300. In another example, tasks can be deferred or marked inapplicable only through contact with and approval from a fiduciary advisor. In certain examples, task statuses can be generated dynamically as required by the users.

In certain examples, a compliance task 210 can be categorized during creation as required, recommended, suggested, and optional. These categories can be used during compliance scoring, as is detailed below in regard to FIG. 10. For example, a compliance task 210 categorized as suggested, is not required to maintain compliance and therefore does not impact compliance scoring as much as a required or recommended compliance task.

The last operation in the method 600 includes the option of creating a compliance task 210 baseline score 225 at 690. In certain examples, the system 400 includes the ability to maintain a compliance score associated with each retirement plan (compliance scoring module 410). In one scoring configuration, each compliance task 210 includes a baseline compliance score 225. The baseline score 225 defines the maximum score a user 145 can receive for completing that compliance task 210 in a timely manner. As will be discussed below in reference to FIG. 9, other scoring methods are envisioned that do not require a baseline score 225.

Figure 7:
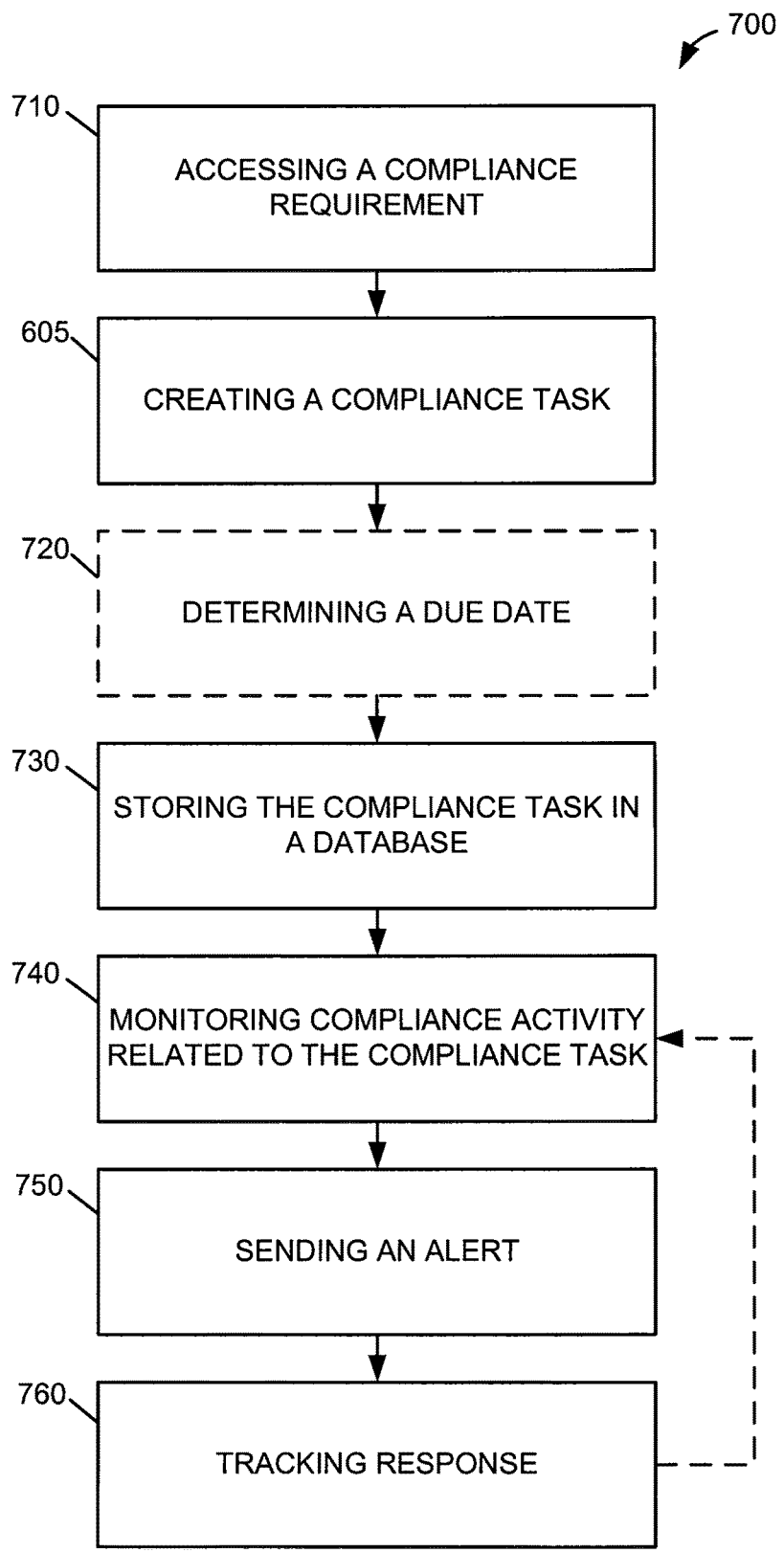
FIG. 7 illustrates an example of a method of enforcing compliance with a fiduciary compliance plan regarding the administration of a retirement plan.

FIG. 7 illustrates an example of a method of enforcing compliance with a fiduciary compliance plan regarding the administration of a retirement plan. In this example, a method 700 depicts an example for tracking and enforcing compliance with a compliance plan by a retirement plan fiduciary. The method 700 includes accessing a compliance requirement 710, creating a compliance task 605, determining a due date 720, storing the compliance task 730, monitoring compliance activity 740, sending an alert 750 and tracking a response 760. In certain examples, a portion of the method 700 is continuously repeated during the life span of the monitored retirement plan.

In certain examples, the method 700 begins by accessing a compliance requirement at 710. Accessing a compliance requirement can include any of the operations discussed above in relation to operations 610 or 615 in FIG. 6. In another example, accessing a compliance requirement 710 can include connecting to an external compliance requirement database maintained by a third party provider. In yet another example, accessing a compliance requirement 710 can include accessing requirements stored in the compliance database 130. In this example, compliance requirements are pre-loaded into the compliance database 130 by extracting the requirements from the applicable regulations and storing them categorized by retirement plan type, such as 401k. Once a compliance requirement is identified and accessed, the method 700 continues by creating a compliance task 210, as depicted in FIG. 6.

In certain examples, the method 700 continues by determining a due date 215 associated with the compliance task 210 at 720. As discussed above, compliance tasks 210 can have at least two different types of dates, static or dynamic. Static dates are typically derived directly from the compliance requirement. In some examples, the compliance task 210 will have a dynamic date that needs to be determined by a user 145. In these examples, the user 145 will set, at least an initial date, at 720. In certain examples, the client can defer entering a due date at 720. Once the compliance task 210 is created in operations 710, 605 and 720, the method 700 will store the task in the compliance database 130 at 730.

At 740, the method 700 continues by monitoring compliance activity related to the compliance tasks 210. In certain examples, monitoring includes reviewing compliance task status 220. Reviewing compliance task status 220 can include scanning the compliance database 130 for tasks with due dates 215 within a task alert window. The task alert window is a configurable period of time prior to a task's due date 215 for sending alerts to certain client's 140 regarding the upcoming due dates. As mentioned above, in some examples, alerts can continue even after the due date has pasted if the compliance task has not been addressed. In these examples, the task alert window is still used to identify when alerts will begin to be sent. In certain examples, the task alert window can be configured at the individual plan level, according to groups or categories of compliance tasks, or by individual compliance task.

In certain examples of configurations, compliance tasks 210 can be categorized by various attributes. The task attributes can include activity type, retirement plan type, task source (e.g., regulation, court ruling, or professional judgment), or compliance task 210 importance level. In an example configuration, task alert windows can be set based on compliance task 210 importance level, with more important tasks having a longer alert window. A longer alert window provides the user 145 more lead time to address the compliance task 210. The ability to vary the task alert window is a useful capability as some tasks, such as a quarterly meeting, can take additional advance planning and preparation to properly complete.

In an example, the monitoring of a compliance task's 210 activity leads to identifying conditions that require notification of various entities associated with a retirement plan, including a user 145 or a fiduciary advisor. The method 700 handles sending alerts at 750. In certain examples, alerts are sent based on monitoring due dates 215 or compliance task status 220 changes. In an example, an alert can be sent when a compliance task's status 220 is changed to complete. Alerts can be configured to be sent to any client's 140 associated with a retirement plan within the system 300. In another example, an alert can be sent when a compliance task's status 220 is changed to deferred. In this example, the deferred alert can be sent to a fiduciary advisor for review of the action. Enabling checks and balances on compliance task 210 activity assists in ensuring compliance.

In an example, the system 300 is capable of sending alerts via various messaging mechanisms, such as e-mail and FAX. The alerting module 320 is capable of being configured to send e-mail via SMTP, FAX via POTS lines or VOIP, as well as instant messages, text messages via SMS, or voice mail messages. Alerts sent via e-mail, instant messaging, or text messaging can include hyperlinks back to the associated compliance task 210 with in the system 300. In another example, e-mail and FAX alerts can include optional compliance task 210 components such as templates 260, sample documents 270, or checklists 265 that need to be addressed as part of the compliance task 210.

In certain examples, the method 700 includes the ability to track responses to alerts at 760. Tracking alert responses is another method of providing closed loop control over plan compliance. In certain example configurations, tracking can generate additional alerts if a previous alert has not been addressed by the original recipient. In another example, tracking responses can trigger involvement by a fiduciary advisor to follow up on non-responsive clients 140.

Figure 8:
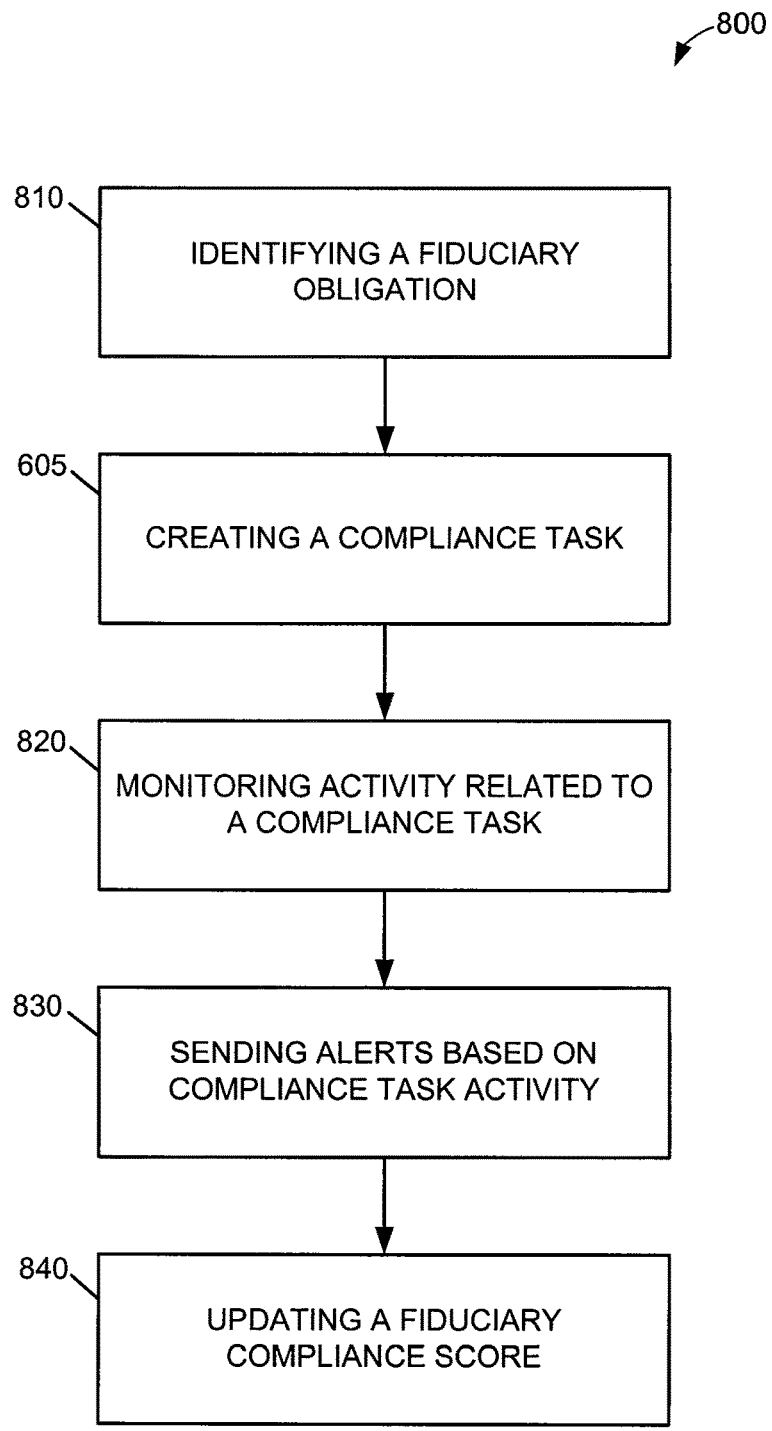
FIG. 8 illustrates an example of a method of tracking the level of compliance with a fiduciary compliance plan governing the administration of a retirement plan.

FIG. 8 illustrates an example of a method of tracking the level of compliance with a fiduciary compliance plan governing the administration of a retirement plan. The method 800 includes operations for identifying a fiduciary obligation at 810, creating a compliance task 210 at 605, monitoring activity related to a compliance task 210 at 820, sending alerts based on compliance task activity at 830, and updating a fiduciary compliance score at 840. Details associated with the first four operations are discussed above in relationship to FIGS. 5 and 6.

The final operation illustrated in the method 800 is updating a fiduciary compliance score at 840. In certain examples, a fiduciary compliance score is used to determine the level of compliance for a particular retirement plan at the time the score was calculated. The fiduciary compliance score is intended to reflect an objective assessment of how well the fiduciary compliance plan is being followed. In an example, the fiduciary compliance score is based on a theoretical prefect score for a similar type of retirement plan. For example, all 401k plans can be scored against a similar theoretical model or baseline plan. In this example, it is unlikely that a perfect compliance score will ever be maintained, as any individual plan can have unique characteristics and is likely to be at a different stage than the baseline plan. In another example, the compliance score can be a relative score that is normalized based on a theoretical model score. In this example, the normalization process would factor in individual plan variation and allow for scoring on a set scale that would provide representative scores across various individuals and plan types.

Figure 9:
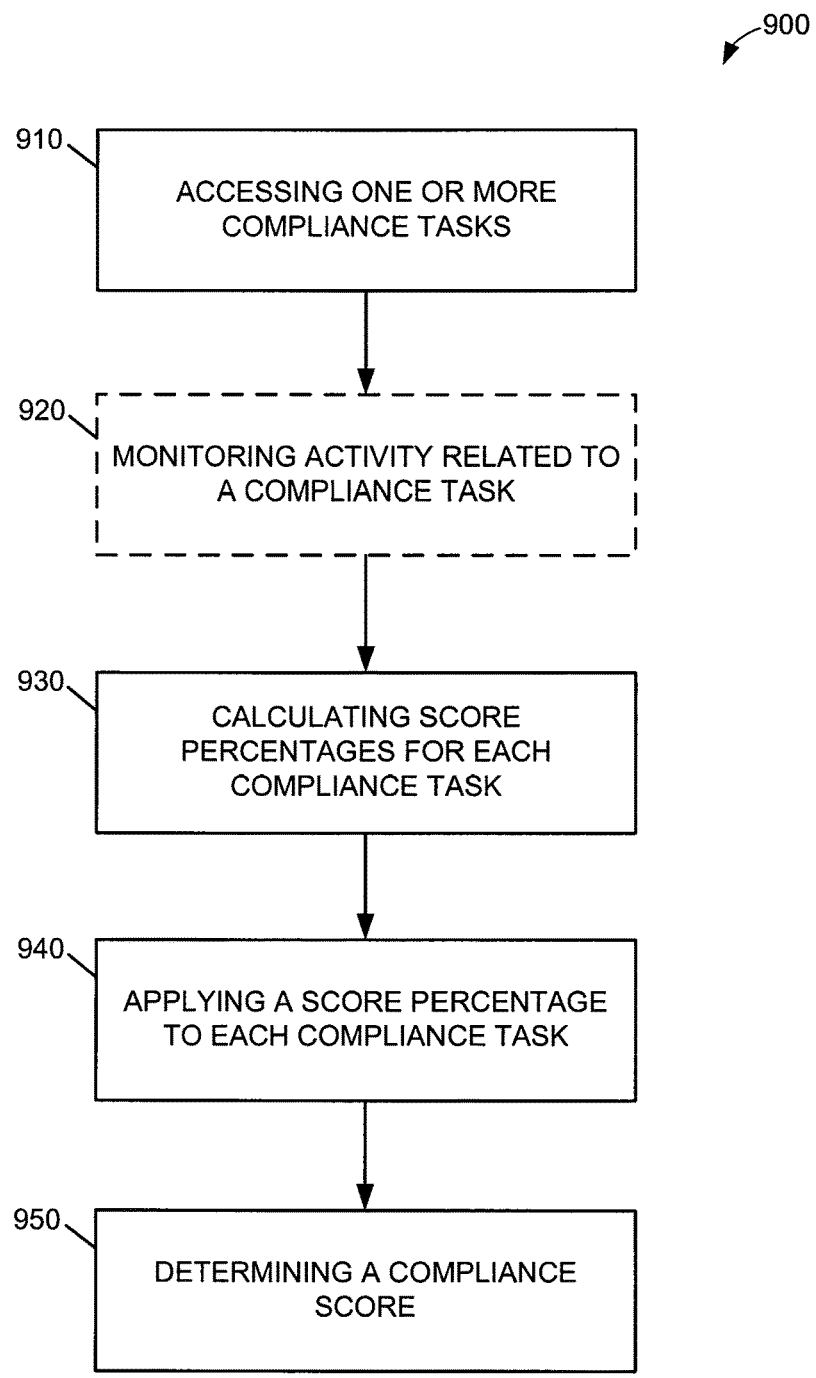
FIG. 9 illustrates an example of a method of scoring conformance with a fiduciary compliance plan associated with the administration of a retirement plan.

FIG. 9 illustrates an example of a method 900 of scoring conformance with a fiduciary compliance plan associated with the administration of a retirement plan. In certain example configurations, compliance plans are scored by calculating two different percentages based on task status 220 and timeliness of addressing individual compliance tasks 210. These percentages are then used to adjust the point total associated with each compliance task 210.

The method 900 begins by accessing compliance tasks 210 associated with the particular plan to be scored at 910. In order to obtain the information that can be used to score individual compliance tasks 210, monitoring activity related to those compliance tasks 210 is performed at 920. Monitoring at 920 is shown as an optional operation, because in various example configurations the scoring illustrated by the method 900 can be incorporated into the other compliance enforcement and tracking methods illustrated in FIGS. 7-8 and 10. In another example, the basic scoring illustrated by the method 900 can be performed against the compliance database 130 at any point in time, with no further monitoring of compliance task activity required.

Continuing with the method 900, score percentages for each compliance task 210 are calculated at 930. In this example, two score percentages are calculated for each compliance task 210. The first score percentage is based on each task's current status. For example, a compliance task 210 with a status of complete can be assigned a first percentage of 100%. While a properly deferred compliance task 210 can be assigned a first percentage of 50%. In this example, this first percentage represents the maximum percentage of the compliance task's points 225 that can be obtained for this scoring cycle. However, in another example, the second percentage can be greater than 100% providing an opportunity to earn more than the compliance task's assigned point total 225.

This example continues with a second compliance task 210 score percentage being calculated based on the timeliness of addressing each individual task. For example, if a completed task were completed prior to the due date a second percentage of 100% can be assigned. Alternatively, if a completed task were completed one week after the due date, the second percentage can drop to 75%. In another example, if the completed task where completed two weeks ahead of the due date a second percentage of 110% can be assigned.

Once score percentages for each compliance task 210 are assigned the system 300 applies the score percentages to each compliance task 210 at 940. Applying the score percentages to a baseline compliance task score results in an individual score from each compliance task 210 that can be used to determine a compliance score for the entire plan at this point in time. The plan's compliance score is determined at 950. In certain examples, the plan's compliance score is determined by adding up all the individual compliance task scores and applying a normalization factor to the result. An example normalization factor can be calculated by determining a total possible compliance point total and creating a percentage with the actual compliance point total. The compliance point total can be determined by totaling the points available from all the compliance tasks 210 considered during the method 900.

Figure 10:
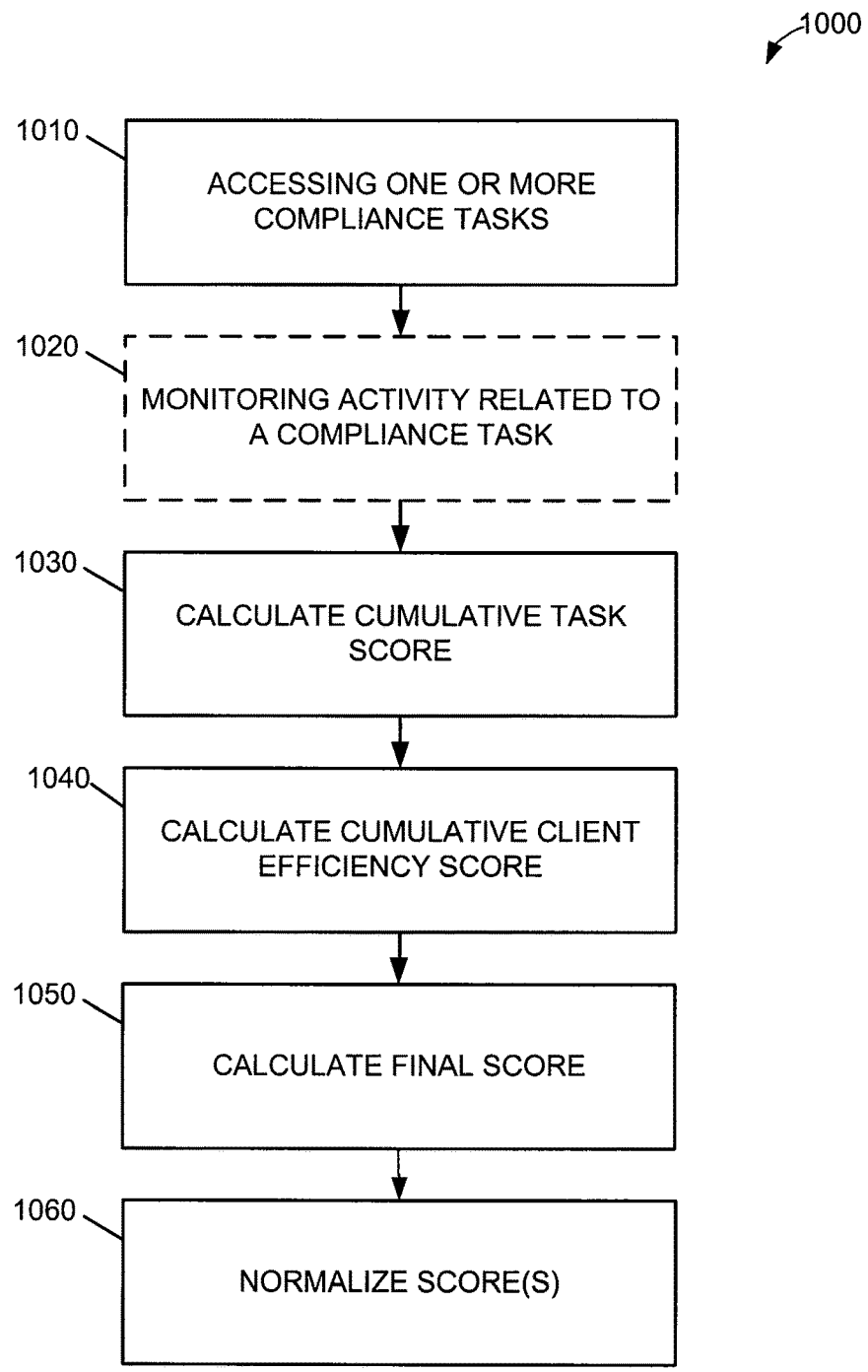
FIG. 10 is a flow chart illustrating a method of scoring compliance tasks and client efficiency, according to an example implementation.
Figure 11:
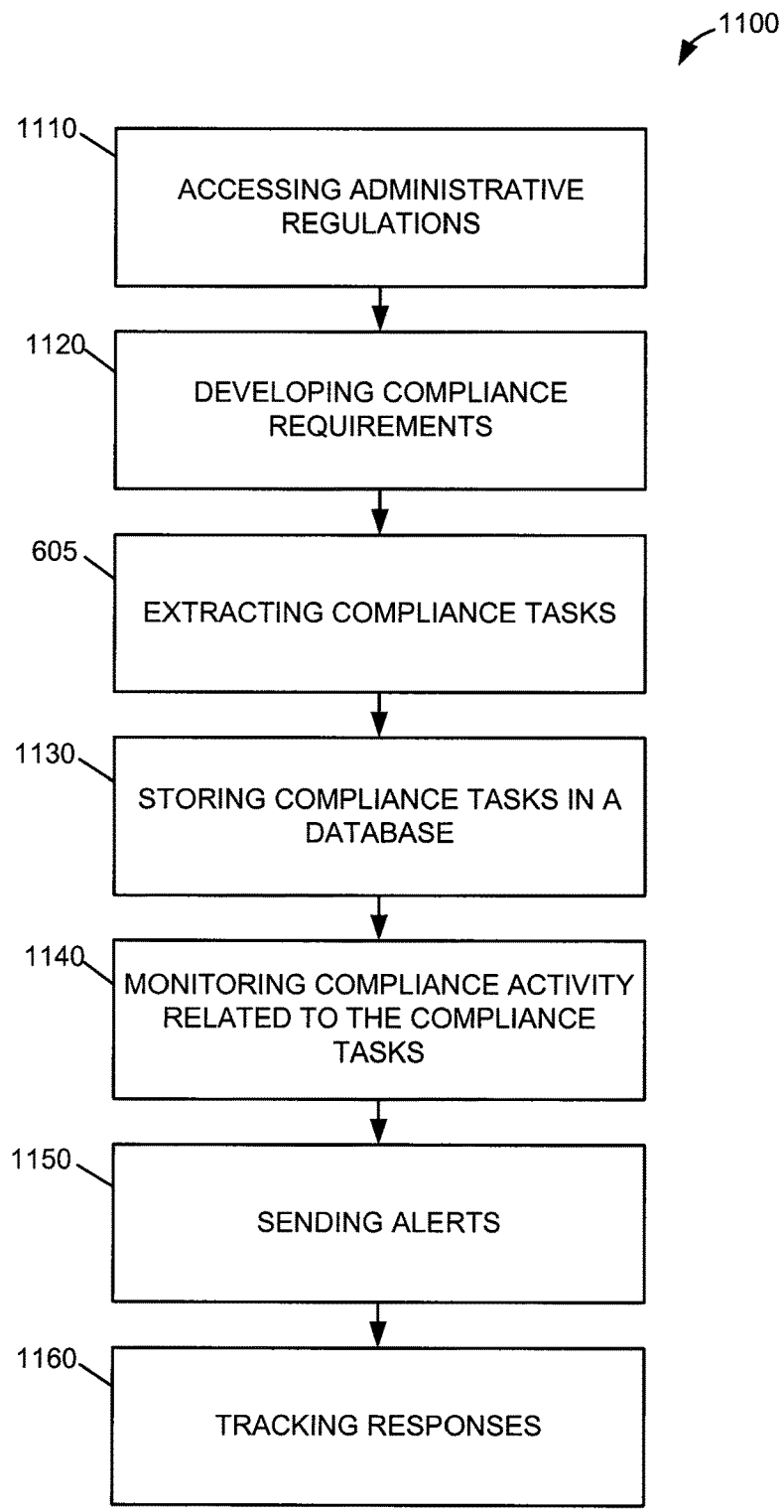
FIG. 11 illustrates an example of a method of enforcing compliance with a fiduciary compliance plan governing the administration of a retirement plan.

FIG. 10 is a flow chart illustrating a method 1000 of scoring compliance tasks and client efficiency, according to an example implementation. In an example, scoring module 410 creates a task score and a client efficiency score to each monitored retirement plan. At 1010, the method 1000 starts with the scoring module 410 accessing one or more compliance tasks. At 1030, the scoring module 410 calculates cumulative task score for all of the compliance tasks accessed at 1010. In an example, the task and client efficiency scoring include the following hard factors and weights:

1. Task Score (Ts)—This is an assigned value associated with a compliance task 210. The value is assigned during compliance task creation at 690 based on compliance experts collective experience, and represents the relative importance of the specified compliance task.
2. Client Response Factor (Crf)—A value representing the amount of time that passes between sending an alert and the user 145 logging into the application to respond.
3. Client Commit Factor (Ccf)—A value representing the amount of time that passes between the alerting engine 320 sending an alert and the user 145 marking the requested alert or associated compliance task as completed in the system 300.
4. Task Type Modifier (TTM)—A value between 0 and 1 indicating how much impact a compliance task has on an overall compliance score. TTM is associated with types such as Required, Recommended, Suggested, and Optional.
5. Real Compliance Ratio (RCR)—A value between 0 and 100 indicating the ratio of compliance tasks completed before the specified due date as compared to those that have been completed late or not at all.
6. Score Balance Factor (SBf)—A value between 0 and 1 indicating how much impact the Task Score and the Client Efficiency Score each have on the final score. The closer to '1', the more the Task Score will impact the Final Score.

In an example, the scoring system makes use of a standard normalization function, which will convert the overall scoring factors into a percentage. This function is represented as follows:

$$n(X_1, X_2, X_3, X_4, X_5, X_6, X_z \ldots,) = (X_y / MAX(X)) * 100$$

Where Max(X) is the largest value in the series. When no is applied to all of the numbers in a series, the largest number will therefore be 100, and subsequent values of X will be adjusted downward, representing a ratio of X to MAX(X).

In an example, the basic scoring algorithm used by the scoring module 410 at 1030 is as follows:

$$\text{Task Score (TS)} = (Ts_1 \times TTM_1) + (Ts_2 \times TTM_2) + (Ts_x \times TTM_x) \ldots$$

At 1040, the scoring module 410 calculates the cumulative Client Efficiency Score. In an example, the Client Efficiency Score is calculated using the following algorithm:

$$\text{Client Efficiency Score (CES)} = ((Crf_1 \times TMM_1) + Ccf_1) + ((Crf_2 \times TMM_2) + Ccf_2) + ((Crf_x \times TMM_x) + Ccf_x)$$

At 1050, the scoring module 410 calculates a final compliance score. In an example, the final score is calculated using the following algorithm:

$$\text{Final Score} = n((TS \times SBF) + (CES \times (1 - SBF)))$$

At 1060, the scoring module 410 normalizes the scores according to the normalization function discussed above.

Figure 12:
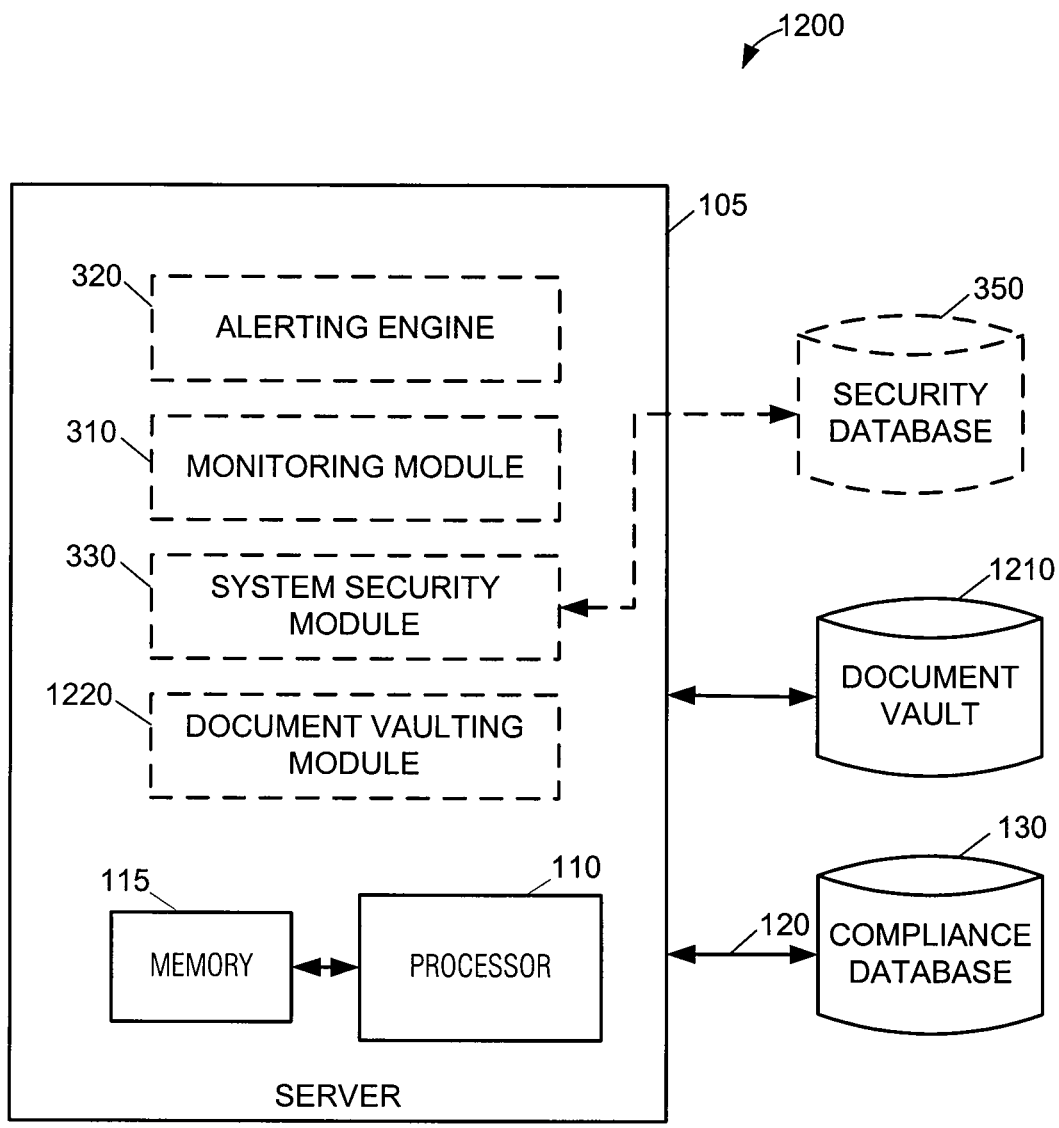
FIG. 12 illustrates an example of a system for enforcing fiduciary compliance in the administration of a retirement plan that includes a document vault.

FIG. 12 illustrates an example of a system for enforcing fiduciary compliance in the administration of a retirement plan that includes a document vault. The system 1200 includes a server 105, a compliance database 130, and a document vault 1210. In certain examples, the server 105 can include a document vaulting module 1220 for interfacing with the document vault 1210. The document vault 1210 can store and index documents related to maintaining compliance for each retirement plan. In some example configurations, the document vault provides a secure location for archiving completed compliance documents, making the document readily accessible in case of an audit or for future reference in administration of the retirement plan. In one example implementation, the document vault 1210 can be a document management system with capabilities such as check in and check out, versioning, and meta-data tracking.

In certain examples, the monitoring module 310 accesses the document vault 1210 directly to scan for missing or updated documents related to individual compliance tasks 210. In another example, the monitoring module 310 accesses the document vault 1210 through the document vaulting module 1220. In some examples, the alerting engine 320 is triggered to send out alerts related to documents by the document vaulting module 1220.

Figure 13:
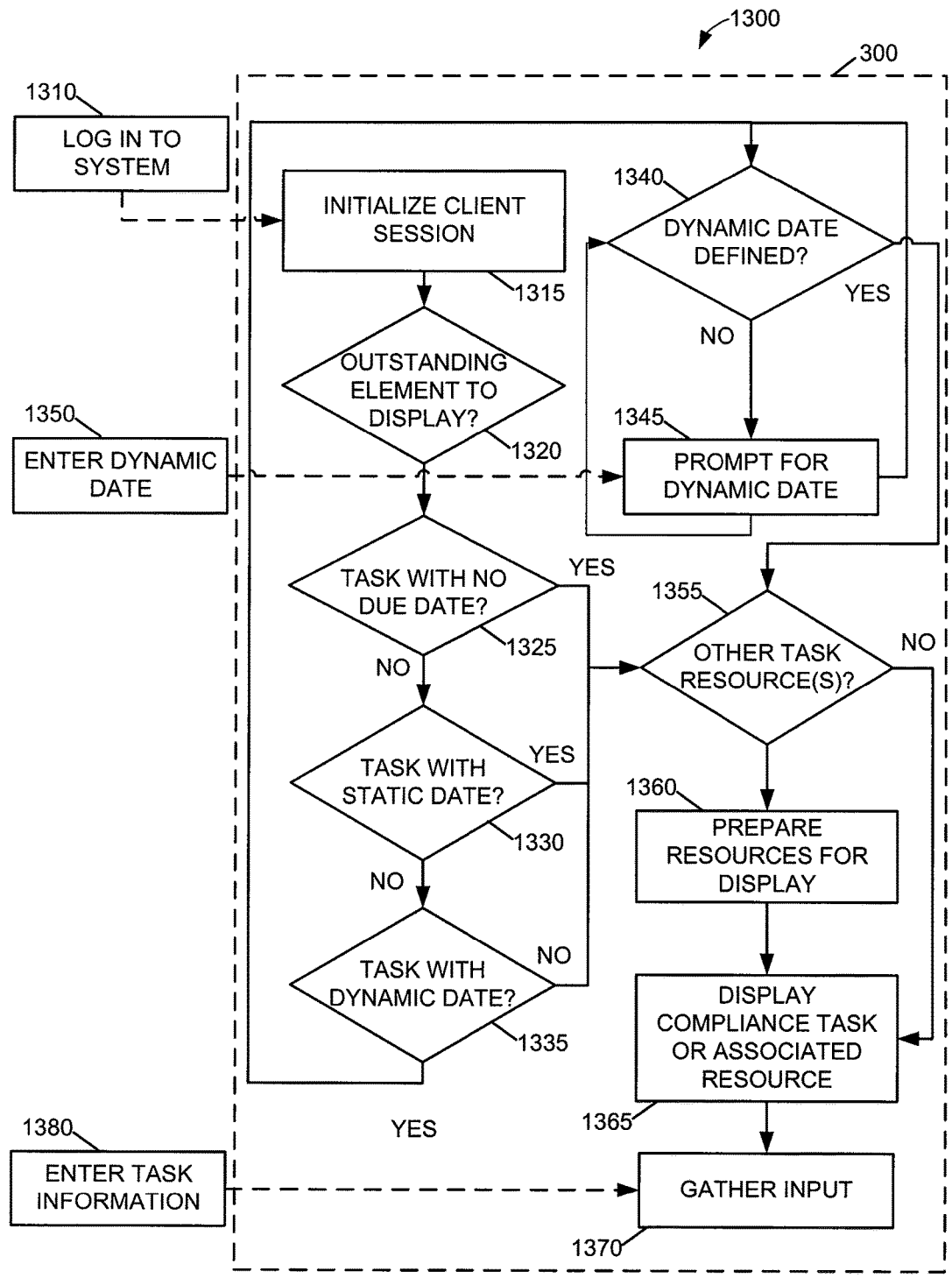
FIG. 13 is a flow chart illustrating a method of enforcing compliance with a fiduciary compliance plan, according to an example implementation.

FIG. 13 is a flow chart illustrating a method 1300 of enforcing compliance with a fiduciary compliance plan, according to an example implementation. The method 1300 includes illustration of some interaction between a user 145 and a system 300 for enforcing fiduciary compliance. In an example, at 1310, the user 145 logs into the system 300. At 1315, the system 300 initializes a client session. At 1320, the system 300 determines if there are outstanding compliance tasks to display to the user 145. In certain examples, the system 300 can also determine if there are other compliance related elements that should be displayed.

At 1325, the system 300 determines if the outstanding compliance task has a due date. If there is no due date, the system 300 continues at 1355. If there is a due date, the system 300 determines if the due date is a static date at 1330. If the due date is a static date processing continues at 1355. However, if the due date is not a static date, the system 300 continues at 1335 by determining if the due date is a dynamic date. If the due date is not a dynamic date, processing once again continues at 1355.

At 1340, the system 300 determines if the dynamic due date has been defined by the user 145. If the dynamic date has not bee defined, the system prompts the user 145 for the date at 1345. At 1350, the user 145 enters the requested date information. At 1355, the system 300 determines if there are additional resources to be displayed. If there are additional resources to display, the system 300 prepares the resources for display at 1360. At 1365, the system 300 displays the compliance task and associated resources. In certain examples, the associated resources can include sample documents, templates, and check lists. In some examples, the system 300 can display resources related to compliance without a specific compliance task. At 1370, the system 300 gathers input entered at 1380 by the user 145 related to the compliance task or associated resources.

In an example, the system 300 collects audit information on a client's 140 activities while interacting with the system 300. The audit data can be used to mine valuable data for a compliance plan, for example validating a client's 140 compliance activities or generating reports depicting the client's 140 interactions with the system 300 over a specified time span.

In an example, the system 300 captures audit data by monitoring every request sent by a user 145 through a client 140 to the server 105. Monitoring every request allows the server 105 the potential of capturing every minor interaction with a user 145. In certain examples, the request takes the form of a HTTP request, including a form submission or clicking a hyperlink. The server 105 then extracts from the CGI.HTTP variable structure any data sent via the request, as well as meta-data type information including, remote internet address, user agent (e.g., browser), and operating system. All of the data extract from the CGI.HTTP variable structure can be saved in the audit database for future reporting. In some examples, the saved data is indexed to the user identification in the User Table 505.

From the audit data, the server 105 can determine a wide variety of information about any particular request, including who a particular user was, what the user was doing, what data was sent, what time the request was processed, where the request came from and what kind of client machine sent the request. In an example, the server 105 can use request time stamp data to reconstruct an entire user history, even one spanning multiple sessions. The audit capabilities are particularly useful should any legal questions regarding a fiduciary's action arise.

Modules, Components and Logic

Certain embodiments are described herein as including logic or a number of components, modules, engines, or mechanisms. A module is tangible unit capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. For example, a module may comprise dedicated circuitry or logic that is permanently configured (e.g., as a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different component at a different instance of time.

Modules can provide information to, and receive information from, other modules or system components. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS) implementation. For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 14:
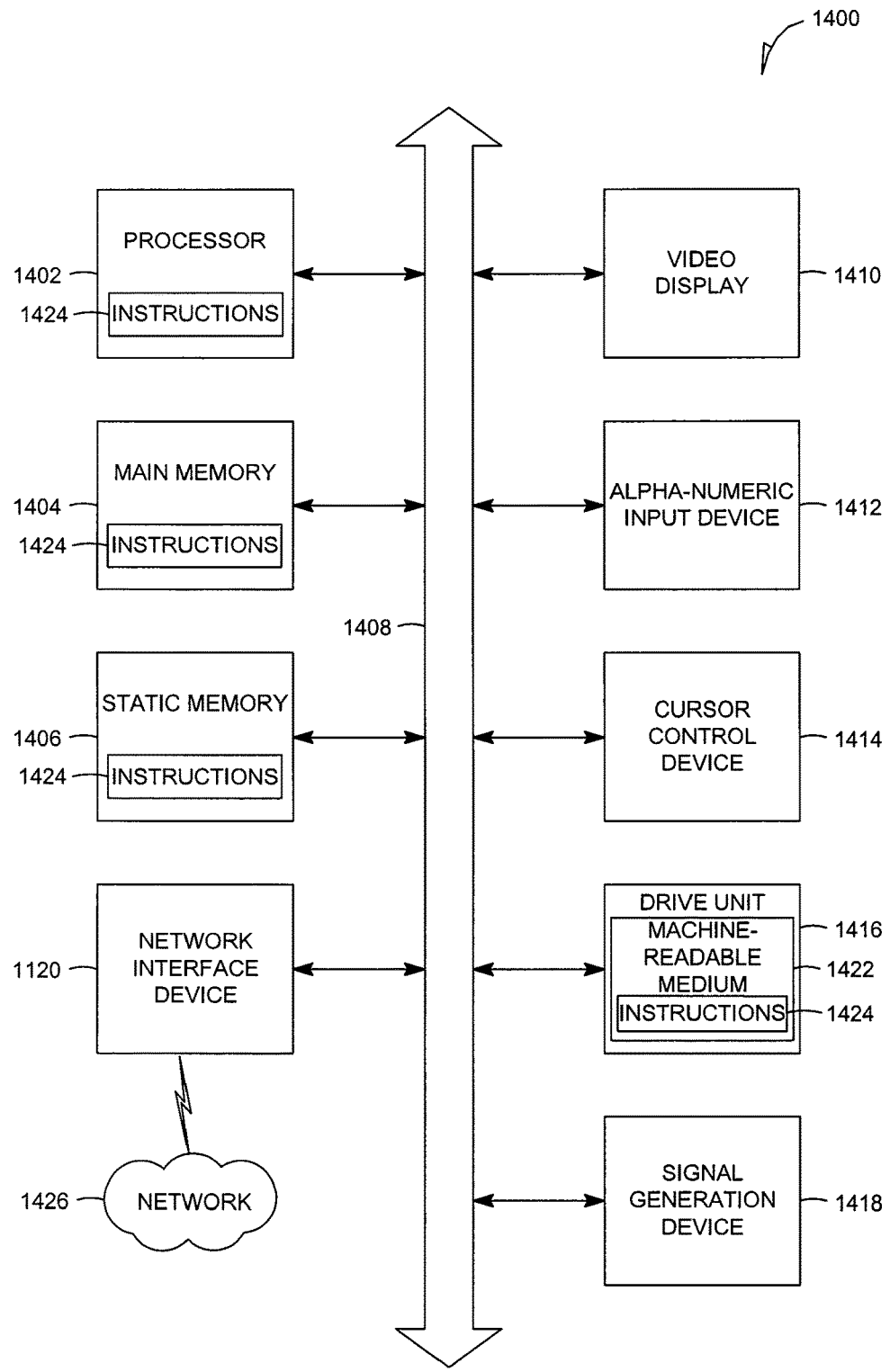
FIG. 14 is a block diagram illustrating an example computer system with instructions for causing the computer system to perform any one or more of the methods discussed herein.

FIG. 14 is a block diagram of machine in the example form of a computer system 1400 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a user interface (UI) navigation device 1414 (e.g., a mouse), a disk drive unit 1416, a signal generation device 1418 (e.g., a speaker) and a network interface device 1420.

Machine-Readable Medium

The disk drive unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1102 also constituting machine-readable media.

While the machine-readable medium 1422 is shown in an example embodiment to be a single medium, the term "machine-readable medium" can include a single medium or multiple media (e.g., a centralized or distributed database, and/or associated caches and servers) that store the one or more instructions or data structures. The term "machine-readable medium" can include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" can include, but need not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks including internal hard disks and removable disks; magneto-optical disks; and CD-ROM and DVD-ROM disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks).

Example Three-Tier Software Architecture

In some embodiments, the described methods can be implemented using one a distributed or non-distributed software application designed under a three-tier architecture paradigm. Under this paradigm, various parts of computer code (or software) that instantiate or configure components or modules can be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above described tiers, and processes or operations about constituting these tiers may be implemented as components (also referred to above as modules or engines). Common too many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol including a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network including an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventors also contemplate examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method for enforcing compliance with a fiduciary responsibility related to administration of a retirement plan, the method comprising:
   accessing a compliance requirement corresponding to a fiduciary responsibility related to administration of the retirement plan by a fiduciary;
   extracting a compliance task from the compliance requirement;
   determining a due date for the compliance task based on a date associated with the compliance requirement;
   storing the compliance task in a compliance task database, the storing done at least in part through use of one or more processors within a computer system communicatively coupled to the compliance task database;
   monitoring, automatically via instructions stored within the computer system and using the one or more processors to execute the instructions, compliance activity related to the compliance task;
   sending, from the computer system, an automatically generated alert, the alert automatically generated based on detecting, via the monitoring, that the compliance task meets a specified alerting condition;
   receiving, on the computer system using instructions executed on the one or more processors, a response to the alert and determining, via instructions executed on the one or more processors, whether any follow up action needs to be taken;
   calculating, automatically by instructions executed on the one or more processors within the computer system, a cumulative task score, wherein the instructions for calculating the cumulative task score include an algorithm that modifies a task score by a task type modifier for each compliance task, and wherein the task score for the compliance task is based on a point value associated with the compliance task;
   calculating, automatically by instructions executed on the one or more processors within the computer system, a client efficiency score associated with the compliance task, the client efficiency score calculated based at least in part on a client response factor and a client commit factor extracted from the monitored compliance activity, wherein the instructions for calculating the client efficiency score include an algorithm that modifies the client response factor by a task type modifier before factoring in the client commit factor for each compliance task in the monitored compliance activity; and
   calculating, automatically by instructions executed on the one or more processors within the computer system, a fiduciary compliance score based on the cumulative task score and the client efficiency score.

2. The method of claim 1, wherein determining a due date includes identifying a static date for the compliance task, wherein the static date is defined by the compliance requirement.

3. The method of claim 2, wherein the static date is the date the task is created.

4. The method of claim 1, wherein determining a due date includes identifying a dynamic date for the compliance task, wherein the dynamic date is associated with the compliance requirement.

5. The method of claim 4, wherein identifying a dynamic date includes receiving input regarding the retirement plan's schedule associated with the dynamic date.

6. The method of claim 1, wherein extracting includes creating:
   a compliance task title;
   a compliance task summary associated with each compliance task; and
   a compliance task status, wherein the compliance task status is initially set to pending.

7. The method of claim 6, wherein extracting includes creating a plurality of compliance task summaries at respective different levels of verbosity.

8. The method of claim 7, wherein creating the compliance task summaries includes a level one summary, a level two summary and a summary that links to the associated compliance requirement, wherein the level one summary is shorter than level two and level two is shorter than the entire associated compliance requirement.

9. The method of claim 1, wherein extracting includes linking an item selected from the following group, a sample document, a template, or a check list to the compliance task.

10. The method of claim 1, wherein monitoring includes reviewing compliance task status, wherein the compliance task status includes only one of, completed, deferred, inapplicable, and pending.

11. The method of claim 1, wherein monitoring includes scanning the compliance task database for compliance tasks with due dates within a task alert window, wherein the task alert window includes a lead time for generating alerts based on compliance task due dates.

12. The method of claim 11, wherein determining a due date includes defining the task alert window for each compliance task.

13. The method of claim 11, wherein storing the compliance task includes selecting a task category and configuring the task alert window for all tasks within the task category.

14. The method of claim 11, wherein storing the compliance task includes configuring the task alert window for all compliance tasks.

15. The method of claim 1, wherein the specified alerting condition includes compliance task status switching from a status of pending to a status of completed.

16. The method of claim 1, wherein sending an alert includes sending an electronic message containing information related to the compliance task associated with the alert.

17. The method of claim 16, wherein the electronic message includes a link that provides direct access to the associated compliance task.

18. The method of claim 1, wherein sending an alert includes sending a FAX message containing information related to the compliance task associated with the alert.

19. A compliance accountability system, the system comprising:
- a server including at least a processor, a memory and a communication interface;
- a compliance task database connected to the server through the communication interface; and
- a non-transitory computer-readable storage medium including instructions that, when executed by the processor, cause the compliance accountability system to perform operations comprising:
  - accessing one or more compliance requirements associated with a fiduciary responsibility related to administration of a retirement plan;
  - extracting a compliance task from the one or more compliance requirements;
  - determining a due date for the compliance task based on a date associated with one or more of the compliance requirements;
  - storing the compliance task in a compliance task database;
  - monitoring compliance activity related to the compliance task;
  - sending an automatically generated alert, the alert automatically generated based at least in part on a monitored compliance task status and when the compliance task has a due date within a specified time period;
  - calculating a cumulative task score, wherein the instructions for calculating the cumulative task score include an algorithm that modifies a task score by a task type modifier for each compliance task, and wherein the task score for the compliance task is based on a point value associated with the compliance task
  - calculating a client efficiency score associated with the compliance task, the client efficiency score calculated based at least in part on a client response factor and a client commit factor extracted from the monitored compliance activity, wherein the instructions for calculating the client efficiency score include an algorithm that modifies the client response factor by a task type modifier before factoring in the client commit factor for each compliance task in the monitored compliance activity; and
  - calculating a fiduciary compliance score based on the cumulative task score and the client efficiency score.

* * * * *